United States Patent

Sato et al.

[11] Patent Number: 6,125,199
[45] Date of Patent: *Sep. 26, 2000

[54] COLOR CORRECTING METHOD AND APPARATUS AND A SYSTEM INCORPORATING THE SAME

[75] Inventors: Tsuneo Sato; Masayuki Saito, both of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,846

[22] Filed: May 2, 1996

[30] Foreign Application Priority Data

Nov. 14, 1995 [JP] Japan ................................. 7-295686

[51] Int. Cl.⁷ ..................................................... G06K 9/00
[52] U.S. Cl. ........................................... 382/162; 358/518
[58] Field of Search ..................................... 358/500, 501, 358/504, 518, 520, 522, 523; 348/661, 659; 345/153, 154, 199; 382/167

[56] References Cited

U.S. PATENT DOCUMENTS

| | | | |
|---|---|---|---|
| 4,159,174 | 6/1979 | Rising | 355/38 |
| 4,409,614 | 10/1983 | Eichler et al. | 358/518 |
| 4,500,919 | 2/1985 | Schreiber | 358/518 |
| 5,202,935 | 4/1993 | Kanamori et al. | 382/162 |
| 5,303,071 | 4/1994 | Kakimura | 358/518 |
| 5,333,070 | 7/1994 | Ichikawa | 358/518 |
| 5,471,324 | 11/1995 | Rolleston | 358/518 |
| 5,543,940 | 8/1996 | Sherman | 358/518 |
| 5,659,406 | 8/1997 | Imae et al. | 358/518 |
| 5,717,783 | 2/1998 | Endo et al. | 382/167 |

FOREIGN PATENT DOCUMENTS 6-101854  11/1987  Japan .
5-183742  7/1993  Japan .

OTHER PUBLICATIONS

Digital Image Processing by Rafael C. Gonzalez & Richard E. Woods, 1992.
Physics Today Processing Digital Color Images: from Capture To displaying by Jan P. Allebach, Dec. 1992.
Patent Abstract of Japan, 5–183742, Jul. 1993.
Patent Abstract of Japan, 5–91311, Apr. 1993.

*Primary Examiner*—Amelia Au
*Assistant Examiner*—Samir Ahmed

[57] ABSTRACT

A color correcting apparatus and method convert a first color signal of a first format into a second color signal of a second format using a conversion matrix. The conversion matrix is obtained based on an achromatic color component conversion matrix and a chromatic color component conversion matrix representing chromacity and achromacity of an imaging device supplying the first color signal. Then, the second color signal is inversely converted into a third color signal of a third format. The third format is a format used by an image output unit. The inverse converting is performed using an inverse conversion matrix. The inverse conversion matrix is obtained based on an inverse of a conversion matrix associated with the image output unit, and the conversion matrix associated with the image output unit is obtained based on an achromatic color component conversion matrix and chromatic color component conversion matrix representing chromacity and achromacity of the image output unit. Furthermore, the color correcting apparatus and method may be employed in an imaging system.

16 Claims, 23 Drawing Sheets

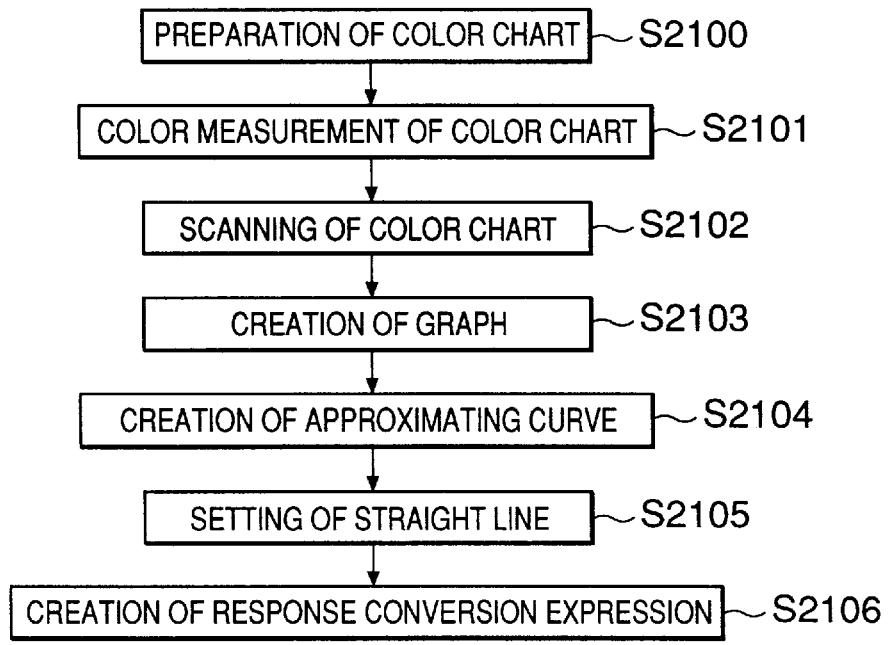

PLANE PERPENDICULAR TO m

PLANE PERPENDICULAR TO m

| NAME OF TABLE | CONTENT |
|---|---|
| LUT1 | $M_{11} \cdot f_{scanner\ R}(R_{scanner})$ |
| LUT2 | $M_{12} \cdot f_{scanner\ G}(G_{scanner})$ |
| LUT3 | $M_{13} \cdot f_{scanner\ B}(B_{scanner})$ |
| LUT4 | $M_{21} \cdot f_{scanner\ R}(R_{scanner})$ |
| LUT5 | $M_{22} \cdot f_{scanner\ G}(G_{scanner})$ |
| LUT6 | $M_{23} \cdot f_{scanner\ B}(B_{scanner})$ |
| LUT7 | $M_{31} \cdot f_{scanner\ R}(R_{scanner})$ |
| LUT8 | $M_{32} \cdot f_{scanner\ G}(G_{scanner})$ |
| LUT9 | $M_{33} \cdot f_{scanner\ B}(B_{scanner})$ |

| NAME OF TABLE | CONTENT |
|---|---|
| LUTa | $f^{-1}_{monitor\ R}(R^{11})$ |
| LUTb | $f^{-1}_{monitor\ G}(G^{11})$ |
| LUTc | $f^{-1}_{monitor\ B}(B^{11})$ |

| COLOR SAMPLE NO. | COLOR COMPONENT (C, M, Y) |
|---|---|
| 0 | ( 0, 0, 0 ) |
| 1 | ( 64, 0, 0 ) |
| ⋮ | ⋮ |
| m-1 | ( 255, 0, 0 ) |
| m | ( 255, 64, 64 ) |
| m+1 | ( 255, 128, 128 ) |
| ⋮ | ⋮ |
| n | ( 255, 255, 255 ) |

PLANE PERPENDICULAR TO m

PLANE PERPENDICULAR TO m

FIG.30

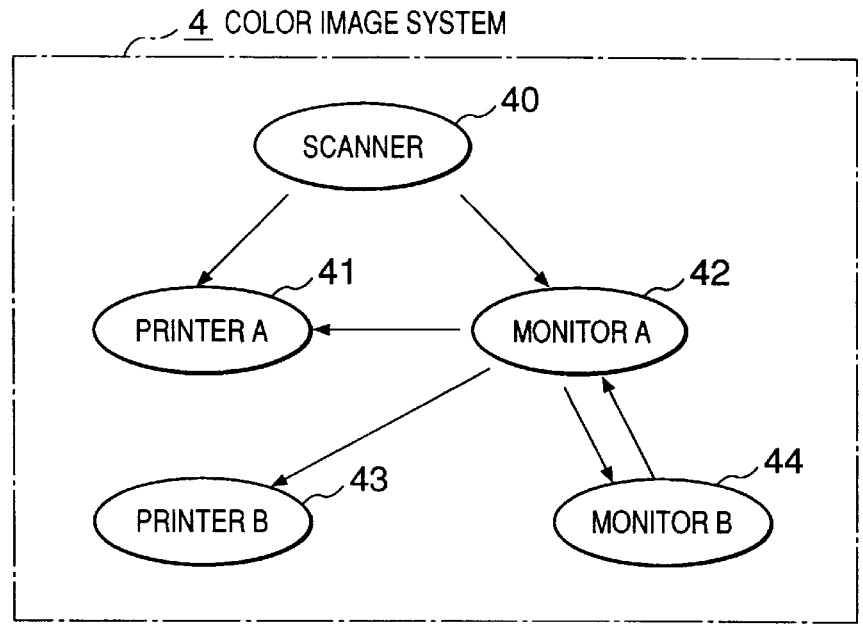

FIG.31

| COLOR CHARACTERISTIC DATA (FOR RGB DATA) | |
|---|---|
| FORWARD DIRECTION | RESPONSE CONVERSION DATA |
| | RGB-TO-XYZ CONVERSION DATA |
| REVERSE DIRECTION | INVERSE RESPONSE CONVERSION DATA |
| | XYZ-TO-RGB CONVERSION DATA |

| COLOR CHARACTERISTIC DATA (FOR CMY DATA) | |
|---|---|
| FORWARD DIRECTION | RESPONSE CONVERSION DATA |
| | CMY-TO-XYZ CONVERSION DATA |
| REVERSE DIRECTION | INVERSE RESPONSE CONVERSION DATA |
| | XYZ-TO-CMY CONVERSION DATA |

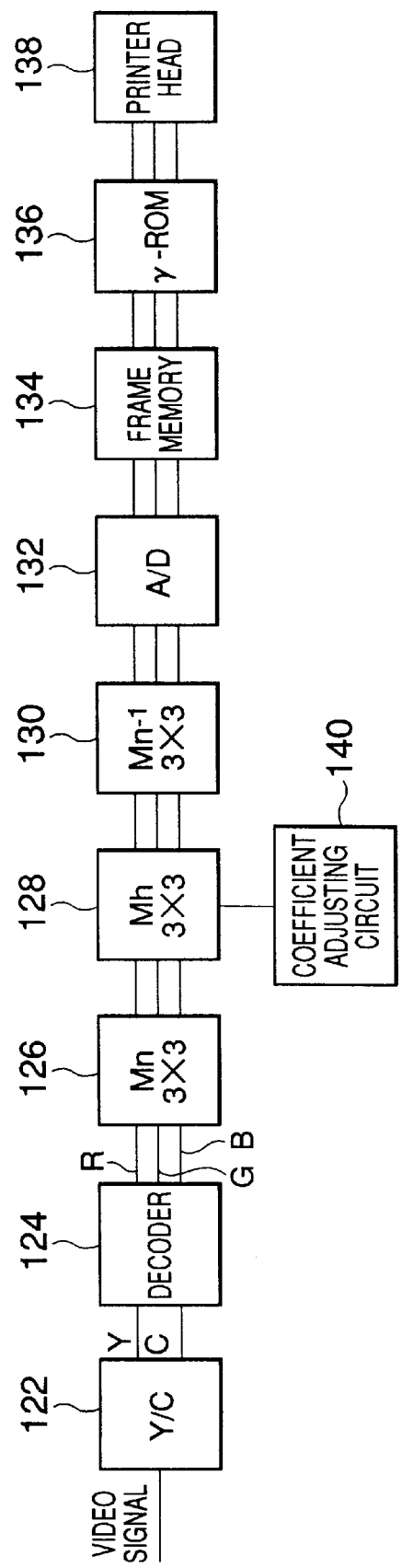

COLOR CORRECTING METHOD AND APPARATUS AND A SYSTEM INCORPORATING THE SAME

BACKGROUND OF THE INVENTION

1. Field of the Invention

The present invention relates to a color correcting method and apparatus and a system incorporating such an apparatus along with other color image equipment.

2. Description of the Related Art

In a color imaging system including a color printer and video monitor, it is desirable that an original color image appear the same whether displayed by the monitor or printed by the printer. Accordingly, color correction must be performed to convert an image to the appropriate format and to account for color characteristics of the particular image input or output device.

A color printer, for example, converts the luminance signals (R, G, B) of the three primary colors (red, green, blue) (hereinafter the "RGB luminance signals") of an original image, obtained through a color separation color scanner, into the main density signals (C, M, Y) of the inks of the three primary colors (cyan, magenta, yellow) (hereinafter the "CMY main density signals"). Color correction is then performed to enhance the reproducibility of the colors and optimize the conversion. Specifically, color correction is accomplished by printing a plurality of color patches of known colors and comparing the colors of the color patches read through a color scanner with the known colors.

FIG. 46 is a block diagram showing a color correction parameter determining apparatus which has been disclosed, for example, in Japanese Patent Laid-Open No. 5-183742.

In FIG. 46, a color storing unit 100 stores a plurality of combinations of the CMY main density signals in a color zone; wherein each combination of the CMY main density signals represents a color. A color printing unit 102 prints, in the form of color patch prints, the colors corresponding to the CMY main density signal combinations stored in the color storing unit 100. A color reading unit 104 images the color patch prints in terms of the RGB luminance signals.

A color conversion parameter storing unit 106 stores the parameters for color conversion. An inverse color converting unit 108 determines inverse functions for non-linear color conversion in accordance with the parameter stored in the color conversion parameter storing unit 106, and converts the CMY main color density signals stored in the color storing unit 100 into the RGB luminance signals by using the inverse non-linear color conversion function.

A color correction coefficient calculating unit 110 calculates color correction coefficients by performing matrix computations so that the RGB luminance signals from the color reading unit 104 coincide with the three primary color luminance signals R0, G0, B0 from the inverse color converting unit 108. A color correction coefficient storing unit 112 stores the color correction coefficients obtained by the color correction coefficient calculating unit 110. A matrix operation unit 114 performs a matrix operation according to the color correction coefficients stored in the color correction coefficient storing unit 112 and the RGB luminance signals from the color reading unit 104.

A color converting unit 116 calculates the approximate value C'M'Y' of the three primary ink color main density signals by non-linearly converting the calculated values given by the matrix operation unit 114 in accordance with the parameters of the non-linear functions stored in the color conversion parameter storing unit 106. An evaluation value calculating unit 118 evaluates the chrominance between the CMY main density signals from the color storing unit 100 and the approximate value C'M'Y' of the three primary ink color main density signals from the color converting unit 116 so as to calculate the chrominance as an evaluation value. A control unit 120 determines whether the evaluation value received from the evaluation value calculating unit 118 has been minimized, and updates the stored value in the color conversion parameter storing unit 106 if the evaluation value has not been minimized so as to converge the evaluation value.

The operation of the apparatus illustrated in FIG. 46 will now be described. The color conversion parameter converting unit 106 stores the parameters of the non-linear functions and the inverse non-linear functions, which are the inverse functions of the former. Some examples of the nonlinear functions are shown below:

$$C = C_{max}(1-(R/R_{max})^\gamma)$$
$$M = M_{max}(1-(G/G_{max})^\gamma) \qquad (1)$$
$$Y = Y_{max}(1-(B/B_{max})^\gamma)$$

These functions are used for converting RGB to CMY where "$\gamma$" (gamma) is the functional parameter in this case; Cmax, Mmax, and Ymax are the maximum values of the CMY main density signals; and Rmax, Gmax, and Bmax are the maximum values of the RGB luminance signals. The inverses of the functions in expression (1) are given by expression (2):

$$R = R_{max}(1-(C/C_{max})^\gamma)$$
$$G = G_{max}(1-(M/M_{max})^\gamma) \qquad (2)$$
$$B = B_{max}(1-(Y/Y_{max})^\gamma)$$

The function parameter is stored in the nonlinear conversion parameter storing unit 106. The inverse color converting unit 108 converts the CMY main density signals stored in the color storing unit 100 into the three primary color luminance signals $R_0$ $G_0$ $B_0$ by using expression (2) with $\gamma$, which has been stored in the color conversion parameter storing unit 106, as the function parameter.

The color correction coefficient calculating unit 110 calculates a color correction coefficient $\{a_{ij}\}$ which makes the RGB luminance signals given by the color reading unit 104 coincide with $R_0$ $G_0$ $B_0$ luminance signals given by the inverse color converting unit 108 by using the publicly known least squares method. The calculated color correction coefficient is then stored in the color correction coefficient storing unit 112.

The matrix operation unit 114 performs the matrix calculation on the RGB luminance signals issued by the color reading unit 104 by using expression (3) wherein the color correction coefficient $\{a_{ij}\}$ stored in the color correction coefficient storing unit 112 is used as the function parameter.

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \qquad (3)$$

The color converting unit 116 performs the arithmetic operations on the calculated value given by the matrix operation unit 114 by using expression (1) wherein the value γ stored in the color conversion parameter storing unit 106 is used as the function parameter; thereby calculating the approximate values C'M'Y' of the three primary ink color main density signals stored in the color storing unit 100.

The evaluation value calculating unit 118 carries out the following operation: supplies the CMY main density signals stored in the color storing unit 100 and the C'M'Y' main density signals given by the color converting unit 116 to the printer for color correction so as to perform printing; and measures the color shown on the print which corresponds to the CMY main density signal using a widely known calorimeter to obtain chromaticity XYZ. Chromaticity XYZ is then converted to a coordinate value (L*,a*,b*) of a uniform color space by using a publicly known relational expression XYZ-L*a*b*. Likewise, a coordinate value (L*',a*',b*') of the uniform color space corresponding to the C'M'Y' main density signal is obtained. The evaluation value calculating unit 118 calculates the chrominance between (L*,a*,b*) and (L*',a*',b*') from expression (4):

$$\Delta La^*,b^* = \{(L.-L.^1)^2+(a.-a.^1)^2+(b.-b.^1)^2\}^{1/2} \quad (4)$$

The evaluation value calculating unit then calculates the evaluation value as the mean value of the chrominances between the colors based on all the CMY main density signals stored in the color storing unit 100 and the corresponding C'M'Y' main density signals of the color converting unit 116.

The control unit 120 receives the evaluation value calculated by the evaluation value calculating unit 118, and updates the function parameter stored in the color conversion parameter storing unit 106 using the widely known non-linear mathematical programming technique to minimize the evaluation value. As soon as the control unit 120 determines that the evaluation value has been minimized, the control unit 120 decides, as the optimum color correction parameters, color correction coefficient $\{a_{ij}\}$ stored in the color correction coefficient storing unit 112 and function parameter γ stored in the color conversion parameter storing unit 106.

FIG. 47 is a block diagram showing an apparatus for adjusting hue, chrominance, and luminance of a video signal using matrix circuits disclosed in U.S. Pat. No. 5,333,070.

In FIG. 47, a Y/C separating circuit 122 separates a video signal into a luminance signal Y and a color signal C. A decoder 124 converts the luminance signal Y and the color signal C into the three primary color signals R, G, and B. Matrix (3 lines by 3 columns) circuits 126, 128, and 130 perform color correction. An A/D converter 132 analog-to-digital converts a color-corrected signal output by the matrix circuit 130, and a frame memory stores the digitized signal. A ROM 136 performs γ conversion, and the output of ROM 136 is used to control the head of a printer 138. Further, an adjusting circuit 140 adjusts the coefficient used in the matrix circuit 128.

The operation of the apparatus illustrated in FIG. 47 will now be described. In this example, the operation of the 3-line-by-3-column matrix circuits 126, 128, and 130 for implementing color correction will be described in detail.

First, the matrix circuit 126 converts a received signal from an RGB coordinate system to an SfY coordinate system, where the SfY coordinate system is a coordinate system constituted by a flesh color axis S, a green color axis f, and a luminance axis Y. If the matrix of the matrix circuit 126 is taken as $M_n$, then matrix $M_n$ is determined as shown in expression (5) in relation to the colors of flesh color C1 and green C2.

$$\begin{pmatrix} 100 \\ 0 \\ Y_1 \end{pmatrix} = M_n \begin{pmatrix} R_1 \\ G_1 \\ B_1 \end{pmatrix} = M_n C_1 \quad (5)$$

$$\begin{pmatrix} 0 \\ 100 \\ Y_2 \end{pmatrix} = M_n \begin{pmatrix} R_2 \\ G_2 \\ B_2 \end{pmatrix} = M_n C_2$$

Then, the matrix circuit 128 performs color adjustment using the SfY coordinate system and issues a signal represented by the SfY coordinate system. If the matrix of the matrix circuit 128 is taken as $M_h$, then $M_h$ is given by expression (6) below.

$$M_h = \begin{pmatrix} h_{11} & h_{12} & 0 \\ h_{21} & h_{22} & 0 \\ h_{31} & h_{32} & 1 \end{pmatrix} \quad (6)$$

In this example, the third column of matrix Mh is (0, 0, 1). This is to keep the luminance of an achromatic color signal intact. When the third column of matrix $M_h$ is (0, 0, 1), the role of each matrix element is as shown below:

h11<1.0 Decreases the chroma of C1
h11>1.0 Increases the chroma of C1
h21<0 changes Hue in the direction of C1-f axis
h21>0 changes Hue in the direction of C1+f axis
h31<0 Decreases the luminance of C1
h31>0 Increases the luminance of C1
h12<0 changes Hue in the direction of C2-S axis
h12>0 changes Hue in the direction of C2+S axis
h22<1.0 Decreases the chroma of C2
h22>1.0 Increases the chroma of C2
h32<0 Decreases the luminance of C2
h32>0 Increases the luminance of C2

The coefficient of matrix $M_h$ is decided according to the instructions given by the adjusting circuit 140, taking the roles shown above into consideration.

Then, the matrix circuit 130 converts a received signal from the SfY coordinate system to the RGB coordinate system. The matrix used for this purpose is the inverse matrix of matrix $M_n$.

The processing steps implemented in sequence by matrix circuits 126, 128, and 130 as stated above perform the color adjustment.

In the color correction parameter deciding apparatus shown in FIG. 46, the parameters are optimized by the least squares method for the combinations of main density signals CMY stored in the color storing unit 100. However, the parameters are not always optimized for combinations of main density signals CMY not stored in the color storing unit 100; therefore, proper printing results cannot be ensured. Consequently, this conventional color correction parameter deciding apparatus hardly ever performs adjustment on CMY main density signals which have not been previously stored.

Additionally, even if the apparatus of FIG. 46 performed adjustment, there is no guarantee that a proper chromatic balance would be achieved after adjustment. For example, after adjustment, a color which should be achromatic ends up tinted, producing an image which looks reddish as a whole.

Further, the apparatus of FIG. 46 minimizes the color correction coefficient and the color conversion parameter for the combination of a specific printer and a specific scanner. Consequently, the color correction coefficient and the color conversion parameter must be optimized again whenever the combination of the printer and the scanner changes.

The apparatus for adjusting hue, chrominance, and luminance of a video signal using matrix shown in FIG. 47 also has its share of drawbacks as well. For instance, this apparatus can only be used under the condition wherein the SfY coordinate system is used and the elements of the third column of the matrix $M_n$ are fixed.

Furthermore, changing the luminance of an achromatic color signal requires adjusting the third column of the matrix; however, as discussed above the apparatus of FIG. 47 does not perform any such adjustment.

The apparatus of FIG. 47 also takes a long time to perform color correction processing since the apparatus requires several coordinate conversions to obtain color adjustment.

SUMMARY OF THE INVENTION

One object of the present invention is to provide a color correction method and apparatus which solve the problems stated above.

A further object of the present invention is to provide a color correcting method and apparatus which are capable of maintaining color balance.

Another object of the present invention is to provide a color correction method and apparatus which perform color correction using matrix operations; and wherein said color correcting method and apparatus determine the matrices used in the matrix operations. An additional object of the present invention is to provide a color correction method and apparatus which can adjust the matrices, and/or adjust predetermined matrices.

A still further objective of the present invention is to provide an imaging system incorporating a color correction apparatus and method achieving the above objectives.

A further objective of the present invention is to provide an imaging system employing the color correction method achieving the above objectives, and which allows for the changing of peripheral devices without recalculating matrices used in color correction.

These and other related objectives are achieved by a color correction method including the steps of, converting a real image into a first color signal of a first format using an imaging device; converting said first color signal into a second color signal of a second format using a conversion matrix, said conversion matrix obtained based on an achromatic color component conversion matrix and a chromatic color component conversion matrix representing chromacity and achromacity of said imaging device; and inversely converting said second color signal into a third color signal of a third format, said third format being a format used by an image output unit, said inverse converting being performed using an inverse conversion matrix, said inverse conversion matrix obtained based on an inverse of a conversion matrix associated with said image output unit, and said conversion matrix associated with said image output unit obtained based on an achromatic color component conversion matrix and chromatic color component conversion matrix representing chromacity and achromacity of said image output unit.

Additionally, these objectives are achieved by a color correcting apparatus including an output interface for receiving a first color signal of a first format from an image input unit; a first matrix circuit converting said first color signal into a second color signal of a second format using a conversion matrix, said conversion matrix obtained based on an achromatic color component conversion matrix and a chromatic color component conversion matrix representing chromacity and achromacity of said image input unit; a second matrix circuit inversely converting said second color signal into a third color signal of a third format, said third format being a format used by an image output unit, said inverse converting being performed using an inverse conversion matrix, said inverse conversion matrix obtained based on an inverse of a conversion matrix associated with said image output unit, and said conversion matrix associated with said image output unit obtained based on an achromatic color component conversion matrix and a chromatic color component conversion matrix representing chromacity and achromacity of said image output unit; and an output interface for issuing said third color signal to said image output unit.

Furthermore, these objectives are achieved by a system including an image input means for converting a real image into a color input signal; monitor means for displaying an image based on a first color output signal; printer means for printing an image based on a second color output signal; a recording device for storing a conversion matrix corresponding to at least said image input means, and storing an inverse conversion matrix corresponding to at least each of said monitor means and said printer means; a color correcting apparatus for converting a first color signal of a first format into a second color signal of a second format, and performing color correction during said converting operation, said color correction apparatus including, an input interface for receiving a first color signal from an image input unit, a first matrix circuit converting said first color signal into a third color signal using a conversion matrix, said conversion matrix obtained based on an achromatic color component conversion matrix and a chromatic color component conversion matrix representing chromacity and achromacity of a first device outputting said first color signal, a second matrix circuit inversely converting said third color signal into said second color signal using an inverse conversion matrix, said inverse conversion matrix obtained based on an inverse of a conversion matrix associated with a second device, and said conversion matrix associated with said second device obtained based on an achromatic color component conversion matrix and a chromatic color component conversion matrix representing chromacity and achromacity of said second device, and an output interface for outputting said second color signal; and a processor for controlling said image input means, said monitor means, said recording device, and said color correcting apparatus, said processor supplying said color input signal to said color correcting apparatus as said first color signal, supplying said conversion matrix corresponding to said image input means to said first matrix circuit, supplying said inverse conversion matrix corresponding to one of said monitor means and said printer means to said second matrix circuit, and supplying said second color signal to said one of said monitor means and said printer means as one of said first color output signal and said second color output signal, respectively.

These objectives are also achieved by a system including, a plurality of image input means for converting a first color signal into a color signal of a second format using a corresponding conversion matrix, each of said conversion matrices being obtained based on an achromatic color component conversion matrix and a chromatic color component conversion matrix representing chromacity and achromacity of a corresponding one of said plurality of image input means; and a plurality of image output means for inversely converting said color signal of said second format into a second color signal using a corresponding inverse conversion matrix, said inverse conversion matrices obtained based on a conversion matrix associated with a respective one of said plurality of image output means, each conversion matrix obtained based on an achromatic color component conversion matrix and a chromatic color component conversion matrix representing chromacity and achromacity of a respective one of said plurality of image output means.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

FIG. 4 is a diagram showing the procedure for creating the response conversion expression in the first embodiment;

FIG. 5 is a diagram illustrating the structure of a test chart;

FIG. 30 illustrates the configuration of a color image system according to a sixth embodiment of the present invention;

FIG. 31 is a diagram showing the structure of the color characteristic data in the sixth embodiment;

FIG. 47 is a block diagram of a prior art apparatus for adjusting hue, chrominance, and luminance of a video signal using matrix circuits.

DETAILED DESCRIPTION OF THE PREFERRED EMBODIMENTS

Figure 1:
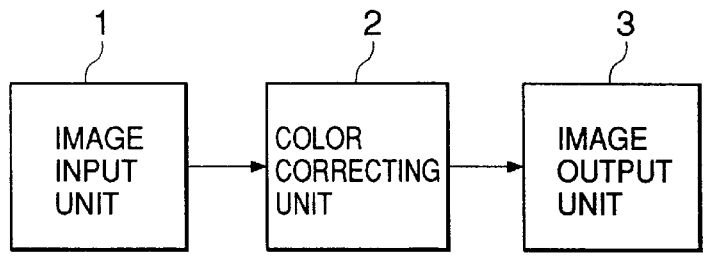
FIG. 1 is a schematic block diagram of an apparatus according to a first embodiment of the present invention.

FIG. 1 is a block diagram showing a first embodiment according to the present invention. As illustrated in FIG. 1, an image input unit 1 is connected to a color correcting unit 2, which performs color correction on image data received from the image input unit 1. An image output unit 3, connected to the color correcting unit 2, outputs an image based on image data corrected by the color correcting unit 2. The image data received from the image input unit 1 is subjected to conversion in the color correcting unit 2 to compensate for the difference in color characteristics between the image input unit 1 and the image output unit 3.

The image input unit 1 can be a scanner or any imaging device which converts a real image into an electronic color signal. In one embodiment, the color correcting unit 2 is a microprocessor (i.e., programmable computer) supported by memory RAM and ROM memory components and interfaces for interfacing with the image input unit 1 and the image output unit 3. Alternatively, the color correction unit 2 may be a hardwired circuit. This hardware or hardwired embodiment of the color correction unit 2 is described in detail below. The image output unit 3 can be a monitor, printer, or any device which reproduces an image from an electronic color signal. As a further alternative, a monitor could serve as the image input unit 1 with the image displayed thereon being supplied as the color input signal.

Since the image input unit 1 and image output unit 3 are conventional devices, their operation will not be described. The following provides a detailed description of the operation of the color correcting unit 2.

Figure 2:
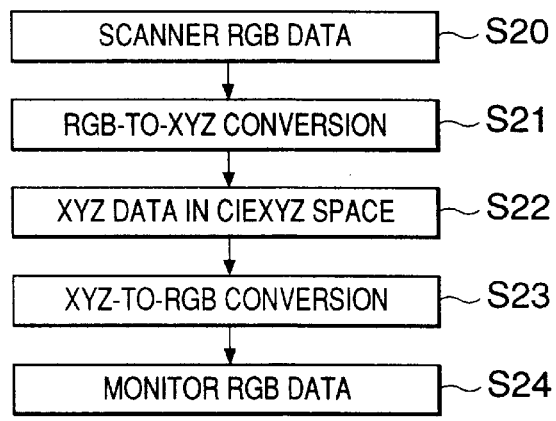
FIG. 2 is a flowchart showing the color performed by the first embodiment.

FIG. 2 is a flowchart showing part of the color correction process performed by the color correcting unit 2. For ease of understanding, the input image data from the image input unit 1 is assumed to be scanner RGB data output from a scanner and the output image data sent to the image output unit 3 is assumed to be monitor RGB data for display on a monitor. Any image input unit or image output unit such as discussed above could be used, however.

In step S21, scanner RGB data of initial step S20 undergoes RGB-to-XYZ conversion. This conversion process will be described in detail below with respect to FIG. 3. The conversion of step S21 results in the production of XYZ data in the well known CIEXYZ color space. Step S22 illustrates the output of step S21. After that, the XYZ data is converted to monitor RGB data through XYZ-to-RGB conversion in step S23. Step S24 illustrates the output of step S23. The conversion process of step S23 will be described in detail below. As the discussion of FIG. 2 above demonstrates, color correction is implemented via the CIEXYZ space.

The color correcting method according to the first embodiment of the present invention will now be described. Firstly, the method for obtaining the converting expression employed by the color correction method will be described. Then, the color correction, which uses the obtained converting expression, will be described.

Figure 3:
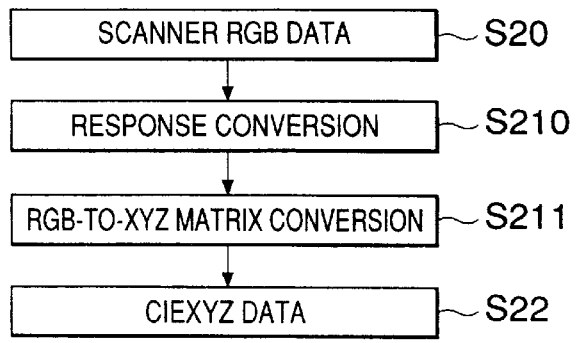
FIG. 3 is a flowchart showing the RGB-to-XYZ conversion procedure performed by the first embodiment.

The RGB-to-XYZ conversion of step S21 will now be described with respect to the flowchart illustrated in FIG. 3. The RGB data of step S20 is subjected to response conversion in step S210 and then to RGB-to-XYZ matrix conversion in step S211.

Figure 6:
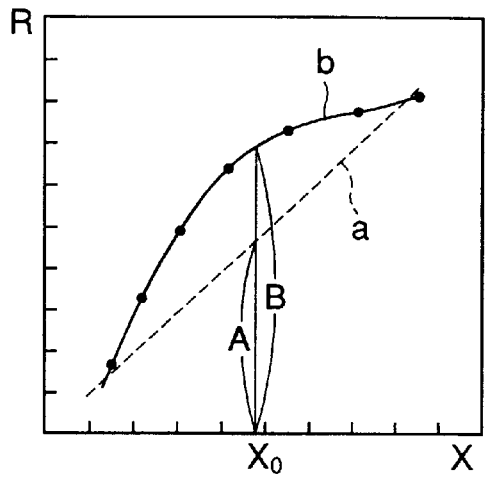
FIG. 6 is a chart showing plotted input data in the first embodiment.

The response conversion of step S210 is implemented in accordance with the response conversion expression obtained by the procedure shown in FIGS. 4–6.

In step S2100 of FIG. 4, color charts including a plurality of color samples and corresponding digital data such as shown in FIG. 5 are prepared. A color can be represented by a combination of three independent color components such as red (R), green (G), and blue (B), or cyan (C), magenta (M), and yellow (Y). FIG. 5 shows the color components of a red-system color chart. This is based on an assumption that each color component has 8-bit gradation. Hence, (R, G, B)=(0, 0, 0) of color sample No. 0 represents black; (R, G, B)=(255, 0, 0) of color sample No. (m-1) represents pure red with no other component; (R, G, B)=(255, 255, 255) of color sample No. (n) represents white.

FIG. 5 indicates that several levels of color from black to white via a pure color (pure red in the case of FIG. 5) are prepared. While FIG. 5 only shows the color components of the red-system color chart, similar color charts exist for the systems of green, blue, cyan, magenta, yellow, and gray. The gray-system color chart includes color samples showing the color levels from black to white via gray. Thus, the color charts of both achromatic colors and chromatic colors are provided by the preparation of color charts in step S2100. By contrast, the conventional color patch prints discussed in the Background of the Invention section were not systematized as stated above.

In the next step, step S2101, the color measurement of the color charts is performed. The plurality of color samples created in the preparation of the color charts are subjected to color measurement using a colorimeter. At this time, the color measurement values are determined using a CIEXYZ color system.

Then in step S2102 the scanning of the color charts is performed. In this step, the plurality of color samples, which have been created in the preparation of the color charts, are scanned by a scanner to obtain read data values. The read data values are the RGB values which have been read through the scanner. The RGB values, however, do not coincide with the values of the color components R, G, and B described in the preparation of color charts.

In the following step S2103, a graph is created. The graph is created according to the data obtained from the color measurement of the color charts and the scanning of the color charts. Specifically, the data required for the response conversion includes the color measurement values of the gray-system color chart and the data values read through the scanner. Based on this data, the graph of R-X, G-Y, and B-Y is prepared. FIG. 6 shows an example of such a graph, wherein the abscissa represents the color measurements X and the ordinate represents scanned values R. In the graph of FIG. 6, the black dots indicate the data of the individual color samples of the color charts.

Then, in step S2104 an approximating curve is created on the graph. In this step, an approximating curve is obtained according to the plotted data (black dots in the graph) using a statistical approach such as the nonlinear least squares method and the n-degree curve least squares method. Solid line b shown in FIG. 6 indicates the approximating curve.

In the following step S2105, a straight line, which passes through the read data value of the white color sample of the color chart (the black dot on the extreme left of FIG. 6) and the read data value of the black color sample of the color chart (the black dot on the extreme right of FIG. 6), is set. The short-dashed line of FIG. 6 represents the set straight line.

In the next step S2106, the response conversion expression is created. FIG. 6 shows the graph created in step S2103, the approximating curve created in step S2104, and the straight line set in step S2105. In this case, if $X=X_0$; the distance between the intersection point of the straight line drawn parallel to the ordinate R and the approximating curve b is taken as B; and the distance between the intersection point of the straight line drawn parallel to the ordinate R and the straight line is taken as A, then the response conversion returns the value of A when the value of R=B is entered. More specifically, the response conversion replaces the data on the approximating curve with the data on the straight line in accordance with the graph of FIG. 6. Accordingly, the conversion response linearizes both chromatic and achromatic components of a color signal. The replacing process for signal R of the scanner, is shown, represented by a function, in response conversion expression (7).

Likewise, response conversion expression (7) can be obtained for signal G and signal B of the scanner from the graphs G-Y and B-Z.

$$R' = f_R(R)$$
$$G' = f_G(G) \quad (7)$$
$$B' = f_B(B)$$

Figure 7:
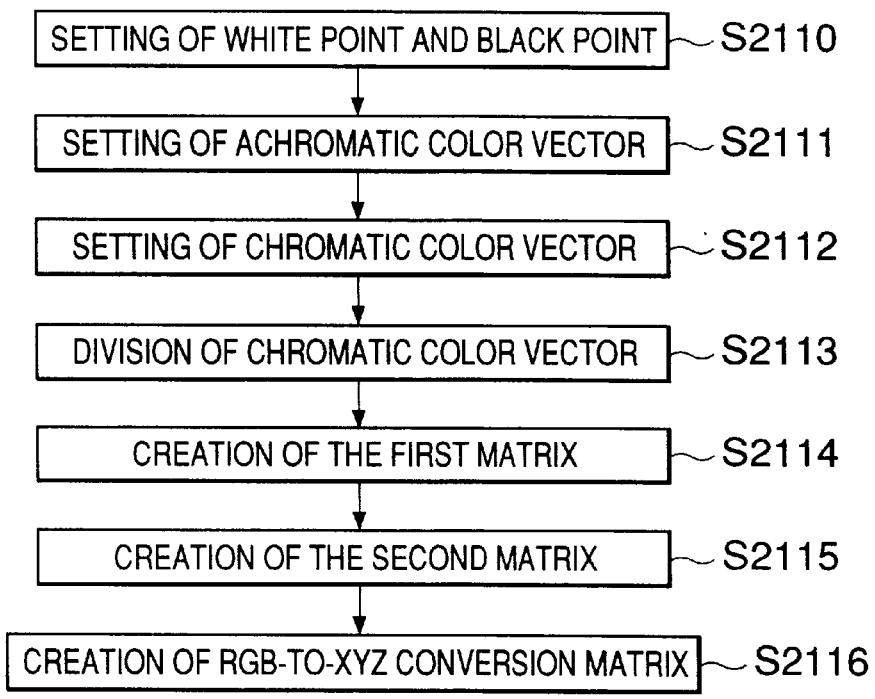
FIG. 7 is a diagram showing the procedure for creating an RGB-to-XYZ conversion matrix in the first embodiment.

The RGB-to-XYZ matrix conversion of step S211 will now be described. The flowchart of FIG. 7 illustrates the procedure for creating the RGB-to-XYZ conversion matrix in the RGB-to-XYZ matrix conversion step S211. The RGB-to-XYZ conversion matrix created according to FIG. 7 is then used to perform the RGB-to-XYZ matrix conversion.

With reference to FIG. 7 through FIG. 11, the procedure for creating the RGB-to-XYZ conversion matrix will be described in detail.

Figure 8:
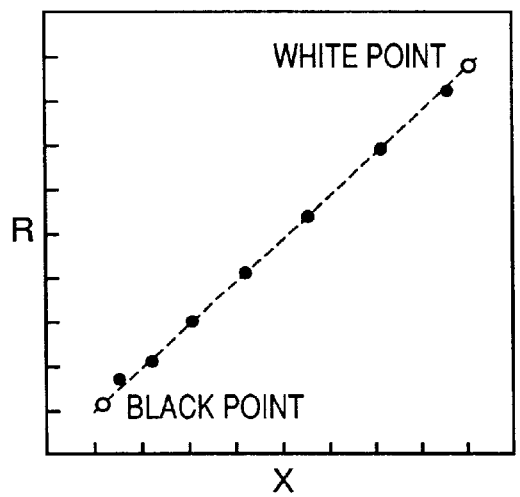
FIG. 8 is a diagram showing how to determine the black point and the white point in the first embodiment.

FIG. 8 illustrates a graph obtained by applying response conversion expression (7) to the scanned values of the gray-system color charts. The scanned values which have undergone the response conversion are indicated by black dots. Using the graph of FIG. 8, the white point and the black point, the white dot on the extreme left and the white dot on the extreme right in FIG. 8, of the scanner are set in step S2110. Since the white and black point of the color samples of the color chart are not necessarily obtained by the scanner, the white and black points are set by extrapolating the string of the measurement points (black dots).

Next, the setting of an achromatic color vector in Step S2111 of FIG. 7 is carried out. It is assumed that the white point and the black point have been set as shown in expression (8) in the step S2110 for setting the white point and the black point. Each of the white and black points has two values, namely, the value in the CIEXYZ color space and the value in the RGB color space of the scanner.

$$\text{White} = (W_X, W_Y, W_Z) \quad (CIEXYZ \text{ color space}) \quad (8)$$
$$= (W_R, W_G, W_B) \quad (\text{Scanner } RGB \text{ color space})$$
$$\text{Black} = (Bk_X, Bk_Y, Bk_Z) \quad (CIEXYZ \text{ color space})$$
$$= (Bk_R, Bk_G, Bk_B) \quad (\text{Scanner } RGB \text{ color space})$$

An achromatic color vector m is then set in step S2111 as shown below by using the values of expression (8).

$$m = \{W_X - Bk_X, W_Y - Bk_Y, W_Z - Bk_Z\} \quad (9)$$

In the following step S2112, the setting of a chromatic color vector of FIG. 7 is carried out. The read data values for the color samples of the chromatic color system (R system, G system, and B system in the case of the scanner) obtained by scanning the color chart in step 2102 are converted using response conversion expression (7) to prepare the same graph as shown in FIG. 8. Then, as in the case of the setting of the white point and the black point in step S2110, the red point, the green point, and the blue point (expression (10)) are set.

$$\text{Red} = (R_X, R_Y, R_Z) \quad (CIEXYZ \text{ color space}) \quad (10)$$
$$= (R_R, R_G, R_B) \quad (\text{Scanner } RGB \text{ color space})$$
$$\text{Green} = (G_X, G_Y, G_Z) \quad (CIEXYZ \text{ color space})$$
$$= (G_R, G_G, G_B) \quad (\text{Scanner } RGB \text{ color space})$$
$$\text{Blue} = (B_X, B_Y, B_Z) \quad (CIEXYZ \text{ color space})$$
$$= (B_R, B_G, B_B) \quad (\text{Scanner } RGB \text{ color space})$$

Vectors are then determined by using expression (10). An example of only the red vector is given in expression (11); however, the same procedure is used also to determine the vectors for green and blue.

$$R_{at\ CIEXYZ} = \{R_X - Bk_X, R_Y - Bk_Y, R_Z - Bk_Z\} \quad (11\text{-}1)$$

$$R_{at\ scannerRGB} = \{R_R - Bk_R, R_G - Bk_G, R_B - Bk_B\} \quad (11\text{-}2)$$

Next, the vector in the CIEXYZ color space (expression 11-1) is divided by the vector in the scanner RGB color space (expression 11-2) and the resulting vector is set as the chromatic color vector (expression 12).

$$e_R = R_{at\ CIEXYZ} / \text{LEN}(R_{at\ scannerRGB}) \quad (12)$$

where LEN ( ) denotes the magnitude of the vector.

Figure 9:
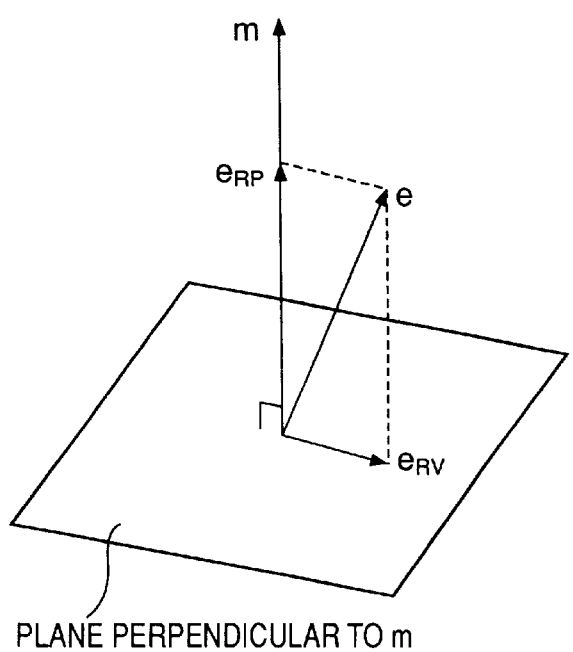
FIG. 9 is a diagram illustrating how to divide a vector in the first embodiment.
Figure 10:
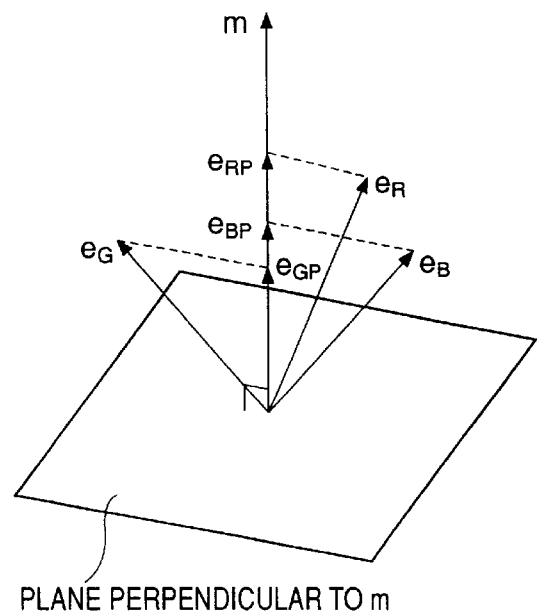
FIG. 10 is a diagram illustrating the components in the direction of vector m in the first embodiment.

Then, in step 2113 of FIG. 7 the chromatic color vector is divided. In general, once the decomposing direction of the vector is decided, the vector can be divided into a plurality of vectors. In this case, as shown in FIG. 9, the chromatic color vector is decomposed into vector $e_{RP}$ which is parallel to achromatic color vector m and vector $e_{RV}$ on a plane which is perpendicular to achromatic color vector m. The same decomposing process applies to chromatic vectors for green G and blue B.

Next, in step S2114 the first matrix is created. The division of the chromatic color vector in step S2113 has rendered three vectors ($e_{RP}$, $e_{GP}$, and $e_{BP}$ shown in FIG. 10). A constant k which satisfies expression (13) will now be determined.

$$m = k\{(W_R - Bk_R)e_{RP} + (W_G - Bk_G)e_{GP} + (W_B - Bk_B)e_{BP}\} \quad (13)$$

From constant k, the first matrix M1 is created according to expression (14).

$$M_1 = k(e_{RP}, e_{GP}, e_{BP}) \quad (14)$$

The meaning of the first matrix $M_1$ will now be described. Using the first matrix $M_1$, expression (15) will be discussed.

$$M_1 \begin{pmatrix} R - Bk_R \\ G - Bk_G \\ B - Bk_B \end{pmatrix} = k(e_{RP}, e_{GP}, e_{BP}) \begin{pmatrix} R - Bk_R \\ G - Bk_G \\ B - Bk_B \end{pmatrix} = \quad (15)$$

$$k(R - Bk_R)e_{RP} + k(G - Bk_G)e_{GP} + k(B - Bk_B)e_{BP}$$

The vectors ($e_{RP}$, $e_{GP}$, $e_{BP}$) are parallel to achromatic color vector m and therefore, can be substituted in expression (16) by using an appropriate achromatic color vector $e_P$, wherein $j_R$, $j_G$, and $j_B$ are constants.

$$e_{RP} = j_R e_P, e_{GP} = j_G e_P, e_{BP} = j_B e_P \quad (16)$$

Substituting expression (15) by using expression (16) gives expression (17), wherein j denotes the substitution of the content within the braces which is a scalar. Expression (17) indicates that implementing the arithmetic operation of expression (15) enables the conversion of matrix expression (15) into a vector which is parallel to the achromatic color vector. In other words, the first matrix represents an achromatic color component conversion matrix, and this matrix represents the achromacity of the scanner.

$$\text{Expression } (15) = \{k(R-Bk_R)j_R + k(G-Bk_G)j_G + k(B-Bk_B)j_B\}e_P = je_P \quad (17)$$

Figure 11:
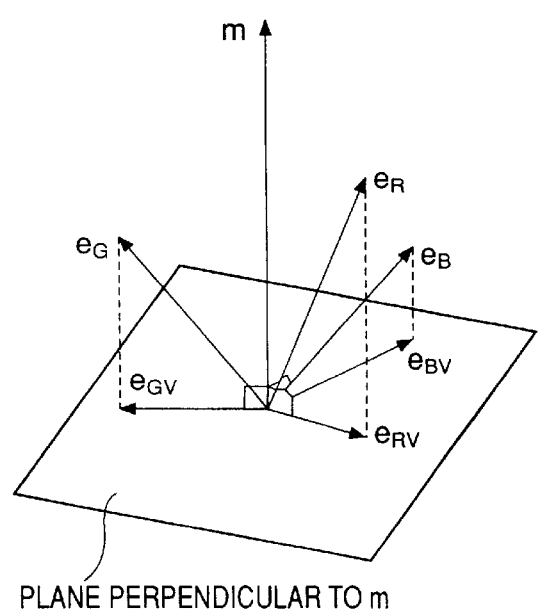
FIG. 11 is a diagram illustrating the components in the direction which is perpendicular to vector m in the first embodiment.

Next, in step S2115 of FIG. 7 a second matrix is created. The division of the chromatic color vector in step S2113 has rendered the three vectors ($e_{RV}$, $e_{GV}$, and $e_{BV}$) as shown in FIG. 11 which are perpendicular to achromatic color vector m. In this case, for the data obtained by reading an achromatic color through a scanner, vectors $e_{RV}'$, $e_{GV}'$, and $e_{BV}'$ are determined so that expression (18) given below is satisfied. These vectors $e_{RV}'$, $e_{GV}'$, and $e_{BV}'$ respectively correspond to the vertical vectors $e_{RV}$, $e_{GV}$, and $e_{BV}$. In general, many combinations of $e_{RV}'$, $e_{GV}'$, and $e_{BV}'$ are possible; in this case, however, the conditions of expressions (18) and (19) shown below are further added. Specifically, vectors $e_{RV}'$, $e_{GV}'$, and $e_{BV}'$ are determined under a restricted condition where a minimum sum of the respective variations is obtained.

$$(W_R - Bk_R)e_{RV}' + (W_G - Bk_G)e_{GV}' + (W_B - Bk_B)e_{BV}' = 0 \quad (18)$$

$$\text{Variation} = \text{LEN}(e_{RV}' - e_{RV}) + \text{LEN}(e_{GV}' - e_{GV}) + \text{LEN}(e_{BV}' - e_{BV}) \quad (19)$$

where LEN ( ) denotes the magnitude of vector.

Using vectors $e_{RV}'$, $e_{GV}'$, and $e_{BV}'$ obtained under the restricted conditions of expression (18) and expression (19), the second matrix M2 shown in expression (20) is determined.

$$M_2 = (e_{RV}', e_{GV}', e_{BV}') \quad (20)$$

The meaning of the second matrix $M_2$ will now be described. Using the second matrix $M_2$, expression (21) will be discussed.

$$M_2 \begin{pmatrix} R - Bk_R \\ G - Bk_G \\ B - Bk_B \end{pmatrix} = (e_{RV}', e_{GV}', e_{BV}') \begin{pmatrix} R - Bk_R \\ G - Bk_G \\ B - Bk_B \end{pmatrix} \quad (21)$$

The vector of expression (21) will now be decomposed into achromatic color vector m1 and chromatic color vector c1 (expression (22)).

$$\begin{pmatrix} R - Bk_R \\ G - Bk_G \\ B - Bk_B \end{pmatrix} = m_1 + c_1 \quad (22)$$

Expression (21) is represented as expression (23) by using expression (22). The first term of the right side member becomes 0 for achromatic color vector m1 as shown by expression (18). This is because vector m1 is a constant multiple of achromatic color vector m. Hence, only the second term remains. Therefore, the second matrix $M_2$ represents a chromatic color component conversion matrix which works only for chromatic color components. This matrix, therefore, represents the chromacity of the scanner.

$$\text{Expression } (22) = M_2(m_1 + c_1) = M_2 c_2 \quad (23)$$

In the next step S2116, the creation of the RGB-to-XYZ conversion matrix is carried out. In this step, matrixes $M_1$ and $M_2$ are added in expression (24) to prepare the RGB-to-XYZ conversion matrix M.

$$M = M_1 + M_2 \quad (24)$$

As understood from the meaning of the first matrix M1 and the second matrix $M_2$, even when an achromatic color vector is converted using the RGB-to-XYZ conversion matrix M, the converted vector and the achromatic vector make parallel vectors having black start points. In other words, the RGB-to-XYZ conversion matrix M is a matrix having an achromatic color vector as the specific vector thereof. For this reason, the scanner read data value on an achromatic color vector in the RGB color space of a scanner is always converted on an achromatic color vector in the CIEXYZ color space.

Figure 12:
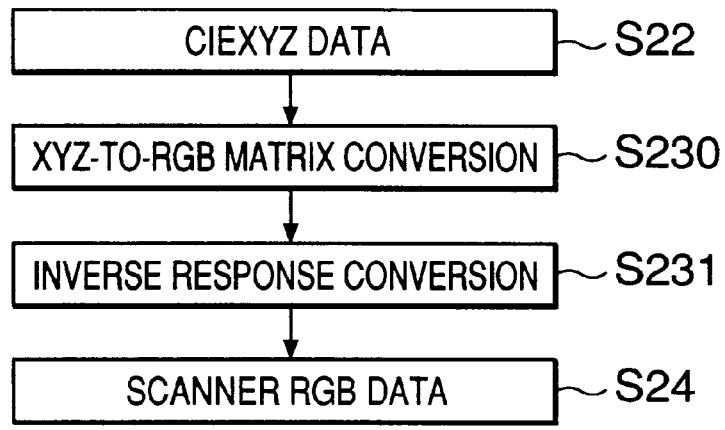
FIG. 12 is a flowchart showing the XYZ-to-RGB conversion performed by the first embodiment.

Thus, as discussed above, the data required for the RGB-to-XYZ conversion of step S23 shown in FIG. 2 has been prepared in steps S21–S22. The XYZ-to-RGB conversion of step S23 will now be described. FIG. 12 shows the details of XYZ-to-RGB conversion of step S23. The XYZ-to-RGB conversion is roughly divided into XYZ-to-RGB matrix conversion in step S230 and inverse response conversion in step S231. These two conversions have an inverse conversion relationship with the RGB-to-XYZ matrix conversion of step S211 and the response conversion of step S210. Accordingly, a mathematically inverse conversion expression may be obtained to provide the data for the XYZ-to-RGB conversion of step S23.

Figure 13:
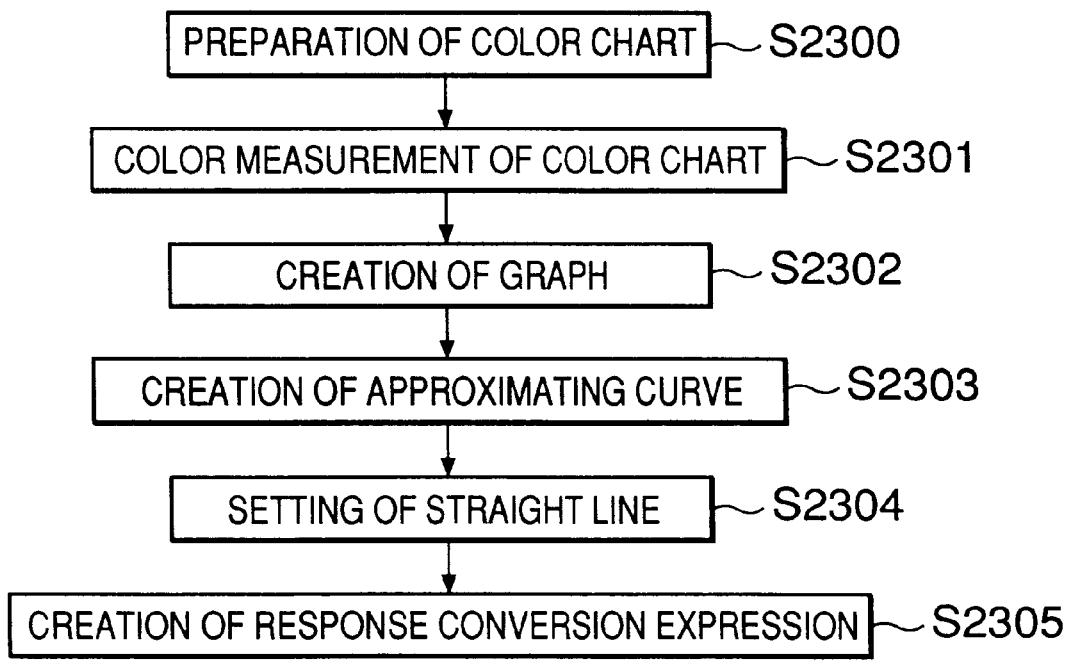
FIG. 13 is a diagram showing the procedure for creating the response conversion expression in the first embodiment.

When the input image data is the scanner RGB data read through a scanner and the output image data is the monitor RGB data displayed on a monitor, the data required for the XYZ-to-RGB conversion of step S23 is the color measurement data on the monitor. The response conversion expression and the RGB-to-XYZ conversion matrix for the monitor can be obtained in the same manner as that for a scanner. The color measurement data on the monitor is obtained by the procedure shown in FIG. 13 to create the response conversion expression. To prepare the color chart in step S2300, the image data shown in FIG. 5 is prepared. In the case of the monitor, the image data provides the RGB value of the monitor.

In the subsequent step S2301, the color measurement of the color chart is performed. For the monitor, the image data prepared for the color chart is displayed on the monitor to perform the color measurement using a calorimeter. The subsequent steps from S2302 to S2305 are the same as steps 2103–2105 described for the scanner with respect to FIG. 4. Accordingly, a detailed description of these steps will not be repeated for steps S2303–S2305.

The RGB-to-XYZ conversion matrix for the monitor is also generated according to the same procedure as that shown in FIG. 7. Accordingly, a detailed description of this procedure with respect to the monitor will not be repeated.

Thus, the response conversion expression and the RGB-to-XYZ conversion matrix for the monitor can be obtained. In the next step, the inverse conversion expressions thereof are mathematically obtained to provide the inverse response conversion expression for step S231 and the XYZ-to-RGB conversion matrix for step S230.

The expressions which have been obtained so far are shown in expressions (25) below. The expressions for a scanner are accompanied by a subscript of $_{scanner}$ and the expressions for a monitor are accompanied by a subscript of $_{monitor}$.

$R' = f_{scanner.R}(R)$ $G' = f_{scanner.G}(G)$  (25-1)

$B' = f_{scanner.B}(B)$ $^T(X,Y,Z) = M_{scanner}{}^T(R',G',B')$  (25-2)

$^T(R'',G'',B'') = M^{-1}{}_{monitor}{}^T(X,Y,Z)$  (25-3)

$R_{monitor} = f^{-1}{}_{monitor.R}(R'')$ $G_{monitor} = f^{-1}{}_{monitor.G}(G'')$  (25-4)

$B_{monitor} = f^{-1}{}_{monitor.B}(B'')$ where T denotes the transposition of a matrix.

According to the procedures stated above, the expressions which represent the color characteristics of the scanner and the monitor have been obtained. The procedure for actually correcting a color by using these expressions will now be described.

Figure 14:
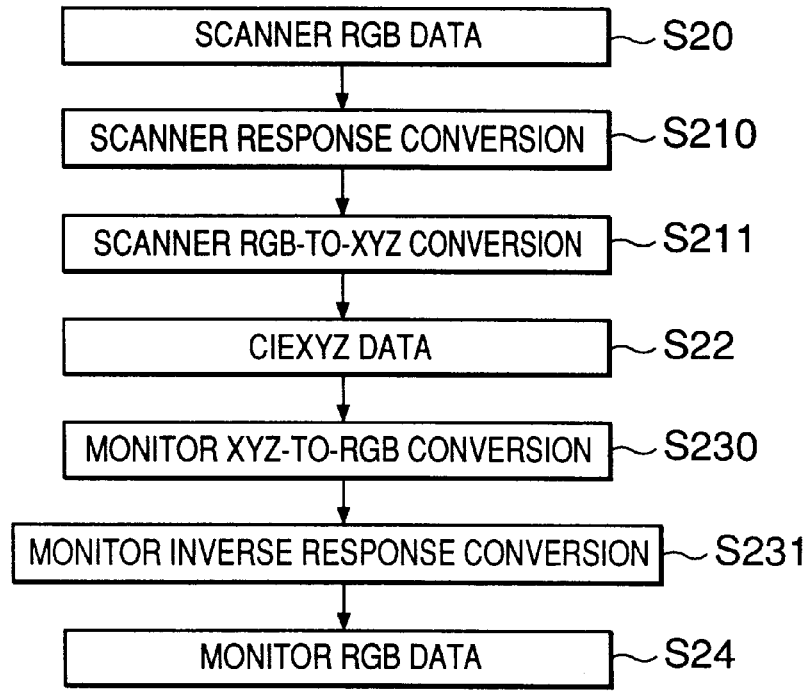
FIG. 14 is a flowchart of the color correction procedure according to the present invention.

FIG. 14 shows the procedure for correcting a color. The scanner RGB data of step S20 is first subjected to the response conversion of step S210 for the scanner. In this case, the arithmetic operation based on expression (25-1) is implemented. Then, the RGB-to-XYZ conversion of step S211, for the scanner, is performed. For this purpose, the arithmetic operation based on expression (25-2) is performed. Implementing the response conversion of step S210 and the RGB-to-XYZ conversion of step 211 gives the CIEXYZ data of step S22. Since the conversion expressions have been obtained according to the procedures shown in FIG. 4 and FIG. 7, carrying out these conversions steps S210 and S211 does not change the achromatic color axis of the scanner.

The XYZ data of step S22 is then subjected to the XYZ-to-RGB conversion of step S230 for the monitor and the inverse response conversion of step S231 for the monitor. For this purpose, the arithmetic operation based on expression (25-3) and expression (25-4) is implemented. These conversions (steps S230 and S231) do not change the achromatic color axis of the monitor, either.

The monitor RGB data of step S24, which has undergone the above conversions, is sent to the image output unit 3 (the monitor in this example) for image output.

Thus, according to the first embodiment of the present invention, RGB is converted to XYZ before being converted back to RGB. The conversion between the aforesaid RGB and XYZ is carried out using conversion matrix M, which is the sum of achromatic color component conversion matrix $M_1$ and chromatic color component conversion matrix $M_2$. The use of the conversion matrix keeps the achromatic color axis of the scanner and the achromatic color axis of the monitor unchanged at the time of conversion. Therefore, the present invention prevents an achromatic color from becoming hued and reddish at the time of correction, making it possible to obtain an image with good color balance.

The second embodiment of the present invention will now be described. The structure of the second embodiment is the same as shown in FIG. 1. In the second embodiment of the present invention, however, the color correction unit 2 performs color correction in a different manner from the first embodiment. For instance, in the second embodiment, the conversion from the scanner RGB to the monitor RGB is carried out without using the CIEXYZ data.

Figure 15:
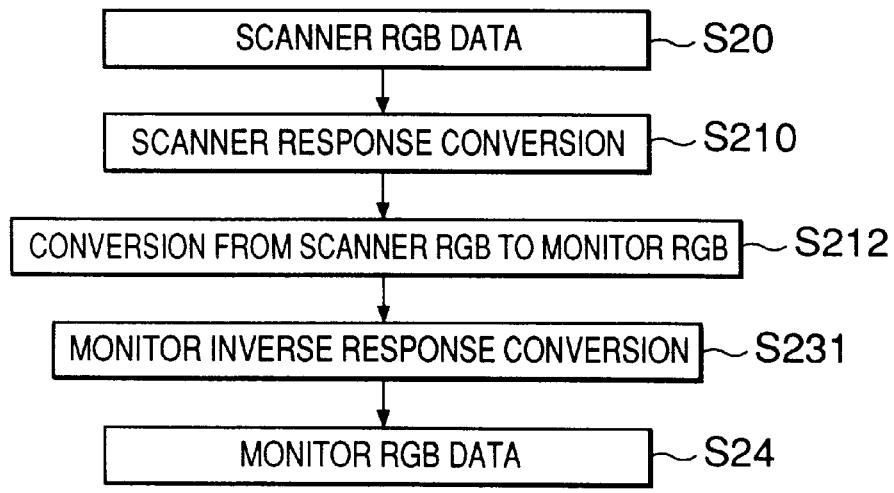
FIG. 15 is a flowchart of the color correction procedure according to a second embodiment of the present invention.

FIG. 15 shows the procedure for correcting a color in the second embodiment of the present invention. FIG. 15 is a flowchart which corresponds to the flowchart FIG. 14.

The scanner RGB data of step 20 is subjected to the scanner response conversion in step S210 as in the case of the first embodiment. In this case, the arithmetic operation based on expression (25-1) is performed.

Next, in the step S212 the scanner RGB is converted to the monitor RGB. In this case, the arithmetic operation using the combination of the expression (25-2) and the expression (25-3) is performed. More specifically, the matrix expression (25-3) used for the monitor XYZ-to-RGB conversion in step S230 and the matrix expression (25-2) used for the scanner RGB-to-XYZ conversion in step S231 are used to carry out the conversion from the scanner RGB to the monitor RGB by employing a single combined matrix determined in advance as shown in expression (26).

$$\begin{pmatrix} R'' \\ G'' \\ B'' \end{pmatrix} = M_{monitor}^{-1} \begin{pmatrix} X \\ Y \\ Z \end{pmatrix} \quad (26)$$

$$= M_{monitor}^{-1} M_{scanner} \begin{pmatrix} R' \\ G' \\ B' \end{pmatrix}$$

$$= M_{scanner-monitor} \begin{pmatrix} R' \\ G' \\ B' \end{pmatrix}$$

Then, the monitor inverse response conversion is carried out in step S231. For this purpose, the arithmetic operation based on the expression (25-4) is performed.

Implementing the series of conversions in steps S210, S212, and S231 does not change the achromatic color axis of the scanner or the achromatic color axis of the monitor. Further, according to the second embodiment of the present invention, since the matrix shown by the expression (26) is determined in advance, the matrix arithmetic operation is carried out fewer times than in the first embodiment, thus achieving quicker processing.

The third embodiment of the present invention will now be described. The structure of the third embodiment is the same as shown in FIG. 1. In the third embodiment of the present invention, however, the color conversion unit 2 carries out the scanner response conversion, the conversion from the scanner RGB to the monitor RGB, and the monitor inverse conversion using lookup tables stored in memories such as RAM and ROM.

Figures 16, 17:
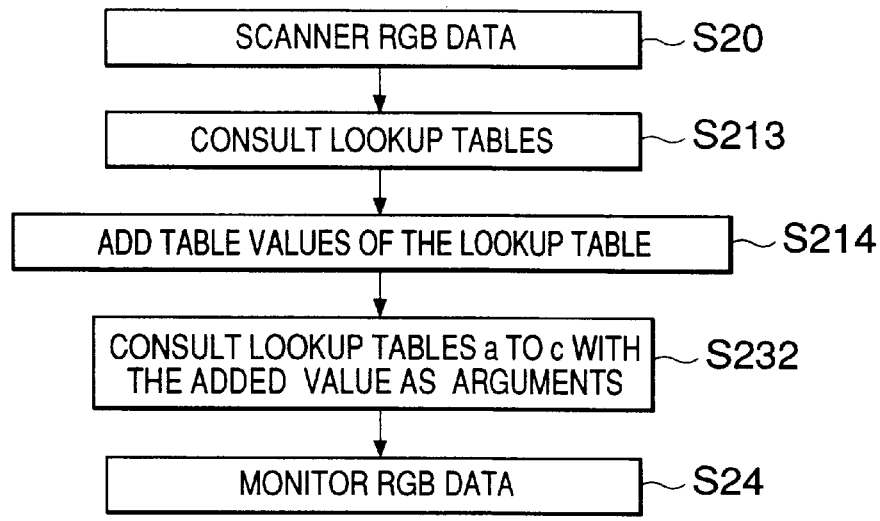
FIG. 16 is a flowchart of the color correction procedure according to a third embodiment of the present invention.
FIG. 17 is a diagram illustrating lookup tables 1 to 9 in the third embodiment.

FIG. 16 shows the procedure for correcting a color in the third embodiment of the present invention.

Firstly, in step S213 lookup tables 1 to 9 are consulted using the scanner RGB data of step S20 as the argument. The lookup tables 1 to 9 are prepared as shown below. The matrix obtained by the conversion from the scanner RGB to the monitor RGB in step S212 in the second embodiment of the invention (212) provides an expression (27).

$$M_{scanner-monitor} = \begin{pmatrix} M_{11} & M_{12} & M_{13} \\ M_{21} & M_{22} & M_{23} \\ M_{31} & M_{32} & M_{33} \end{pmatrix} \quad (27)$$

For the respective elements indicated in the expression (27), the lookup tables 1 to 9 are created according to the table shown in FIG. 17. For example, the content of lookup table 1 (LUT1) is obtained by carrying out the R operation $f_{scannerR}$ ($R_{scanner}$) of the expression (25-1) for the scanner response conversion on the respective inputs (0 to 255) of the scanner and then by multiplying the obtained value by matrix element M11 of the expression (27). In the same manner, the other eight lookup tables 2 through 9 (LUT 2 through 9), which show the R, G, and B inputs of the scanner in relation to the operation results, are created. Thus, the lookup tables are tables which indicate the correspondence between the scanner RGB inputs and the monitor RGB outputs.

By consulting the lookup tables 1 through 9 in step S213, nine table values are obtained. The nine table values are represented as expression (28).

$$\begin{aligned}&\text{LUT1}(R_{scanner})\\&\text{LUT2}(G_{scanner})\\&\text{LUT3}(B_{scanner})\\&\text{LUT4}(R_{scanner})\\&\text{LUT5}(G_{scanner})\\&\text{LUT6}(B_{scanner})\\&\text{LUT7}(R_{scanner})\\&\text{LUT8}(G_{scanner})\\&\text{LUT9}(B_{scanner})\end{aligned} \quad (28)$$

Next, the table values of the lookup tables 1 through 9 are added in step S214. For this purpose, three table values are added as indicated by expression (29) to obtain three numerical values. In this manner, steps S213 and S214 complete the scanner response conversion and the conversion from the scanner RGB to the monitor RGB.

$$\begin{aligned}R'' &= LUT1(R_{scanner}) + LUT2(G_{scanner}) + LUT3(B_{scanner})\\G'' &= LUT4(R_{scanner}) + LUT5(G_{scanner}) + LUT6(B_{scanner})\\B'' &= LUT7(R_{scanner}) + LUT8(G_{scanner}) + LUT9(B_{scanner})\end{aligned} \quad (29)$$

Subsequently, lookup tables a through c are consulted using the aforesaid three adding values as arguments in step S232.

Figures 18, 19:
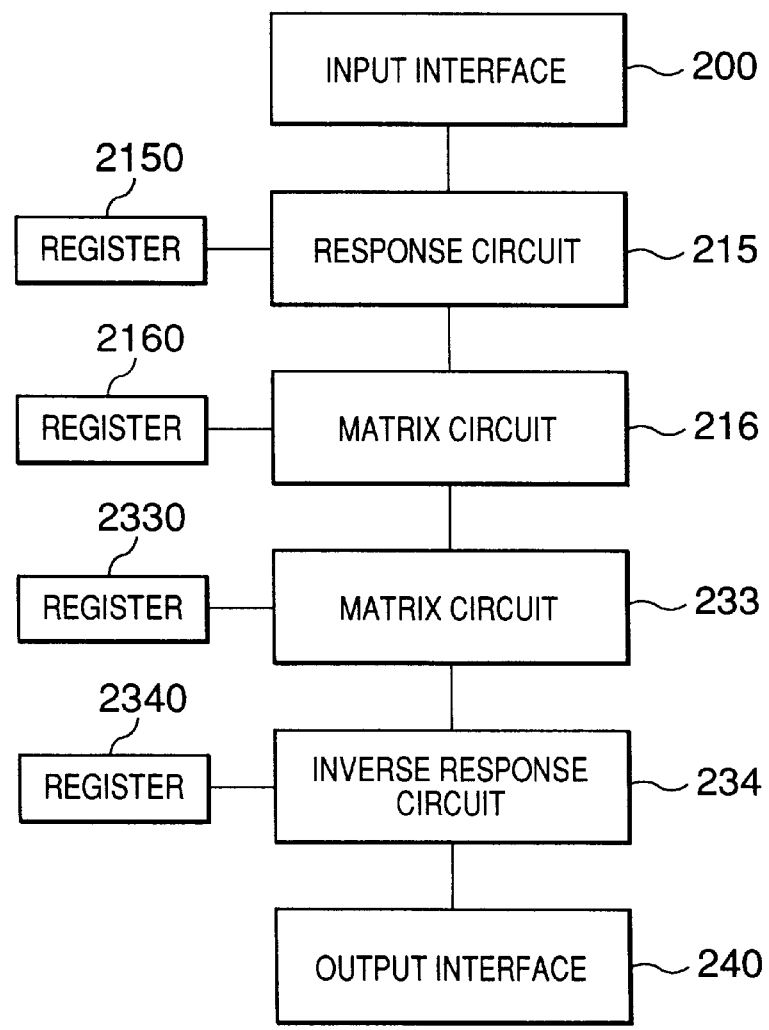
FIG. 18 is a diagram illustrating lookup tables a to c in the third embodiment.
FIG. 19 is a schematic block diagram of the configuration of an apparatus according to a fourth embodiment of the present invention.

Lookup tables a through c (LUT a through c) have the relationship shown in FIG. 18. The contents of LUT a through c indicate the relationship between the input intermediate values R", G", and B" for monitor color correction obtained from the lookup tables of FIG. 17 and the results obtained by assigning the values to the monitor inverse response conversion expression of expression (25-4).

$$\begin{aligned}R_{monitor} &= \text{LUTa}(R'')\\G_{monitor} &= \text{LUTb}(G'') \quad (30)\\B_{monitor} &= \text{LUTc}(B'')\end{aligned}$$

The three table values (expression 30), which have been obtained as the result of consulting lookup tables a through c using the three added values as the arguments in step S232, provide the monitor RGB data of step S24, which have been subjected to the scanner response conversion, the conversion from the scanner RGB to the monitor RGB, and the monitor inverse response conversion of steps S210, S212, and S231 shown in FIG. 15.

In the third embodiment of the invention, the operations are performed using lookup tables, thus enabling even quicker processing than in the second embodiment of the invention.

The fourth embodiment of the present invention will now be described. The fourth embodiment of the invention relates to a hardware structure for accomplishing the processing of the first embodiment of the invention.

FIG. 19 is a block diagram showing a hardware embodiment of the color correction unit 2. In FIG. 19, an input interface 200 controls the interface with the image input unit 1 of FIG. 1.

A response circuit 215 carries out the response conversion on the image data from the image input unit 1 according to the response conversion expression given in the expression (25-1). A register 2150, connected to the response circuit 215, stores the coefficients and parameter values related to the expression (25-1).

A matrix circuit 216 conducts the RGB-to-XYZ matrix conversion shown in the expression (25-2) on the output from the response circuit 215. A register 2160, connected to the matrix circuit 216, stores the coefficients and parameter values related to the expression (25-1).

A matrix circuit 233 conducts the XYZ-to-RGB matrix conversion shown in the expression (25-3) on the output from matrix circuit 216. A register 2330, connected to the matrix circuit 233, stores the coefficients and parameter values related to the expression (25-3).

An inverse response circuit 234 conducts the inverse response conversion in accordance with the inverse response conversion expression shown by the expression (25-4) on the output from the matrix circuit 233. A register 2150, connected to the inverse response circuit 234, stores the coefficients and parameter values related to the expression (25-4).

An output interface 240 controls the interface with the image output unit 3 of FIG. 1 in accordance with the output from the inverse response circuit 234.

The operation of the color correction unit 2 illustrated in FIG. 19 will now be described. Image data supplied to the input interface 200 undergoes the operations through the response circuit 215, the matrix circuit 216, the matrix circuit 233, and the response circuit 234 before being output from the output interface 240. This series of operations constitutes the procedure for color correction shown in FIG. 14. The resulting output data provides the data which match the characteristics of the image output unit 3.

The fourth embodiment of the invention is designed to implement the processing procedure of FIG. 14 by means of hardware or hardwire circuitry, thus enabling quicker processing than in the first embodiment of the invention, the second embodiment of the invention, or the third embodiment of the invention. Furthermore, different characteristics of the image input unit 1 and the image output unit 3 can be successfully handled merely by rewriting the contents of the registers 2150, 2160, 2330, and 2340.

The fifth embodiment of the invention will now be described. The structure of the fifth embodiment is the same as FIG. 1, but may be implemented in hardware such as shown in FIG. 19. The fifth embodiment differs, however, from the previous embodiments in the method of operation. In the first to fourth embodiments of the invention, an RGB input was received and an RGB output was output. In the fifth embodiment of the invention, the RGB input is received and a CMY output is given.

Figure 20:
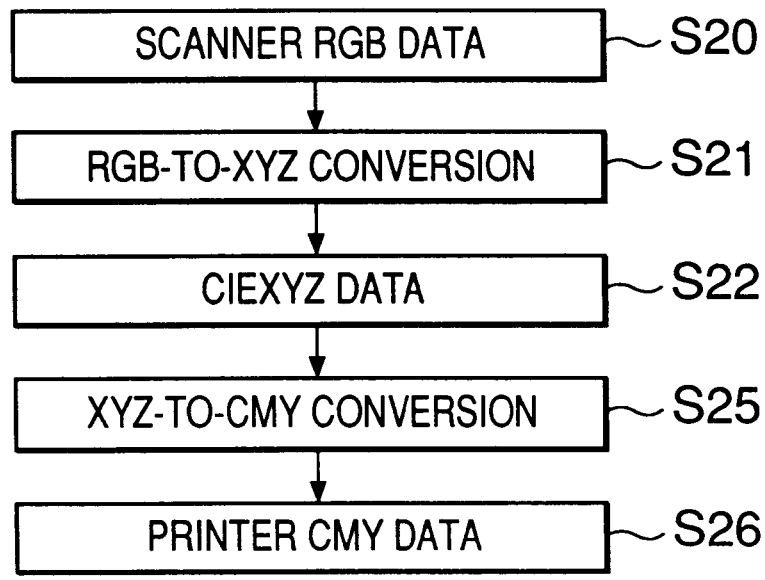
FIG. 20 is a flowchart showing the color correction procedure according to a fifth embodiment of the present invention.

FIG. 20 shows a flowchart of the color correction processing in the fifth embodiment of the invention. In the fifth embodiment of the invention, a description will be given with respect to the color correction from the scanner RGB data in step S20 to printer CMY data in step S26. It should be understood that the CMY data outputs in step S26 may be used by other devices operating on CMY data, and therefore, is not limited to use by a printer. If a printer accepts the RGB data, then the color correction may be performed according to the first embodiment of the invention. If the printer accepts the CMY data, however, then the scanner RGB data of step S20 is subjected to the aforesaid RGB-to-XYZ conversion in step S21 to be converted to the well known CIEXYZ color space data of step S22 as shown in FIG. 20. After that, the XYZ data is converted to the printer CMY data of step S26 by the XYZ-to-CMY conversion in step S25 which will be discussed in detail below.

The RGB-to-XYZ conversion in step S21 of the scanner RGB data of step S20 is as described in the first embodiment of the invention. Therefore, a detailed description of this step will not be repeated.

Figure 21:
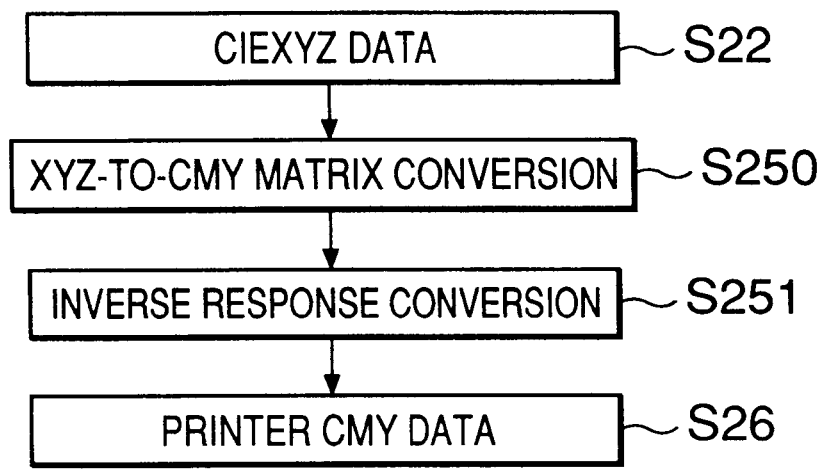
FIG. 21 is a diagram showing the XYZ-to-CMY conversion procedure performed by the fifth embodiment.

The XYZ-to-CMY conversion in step S25 will now be described. The details of the XYZ-to-CMY conversion in step S25 are given in the flowchart of FIG. 21. The XYZ-to-CMY conversion in step S25 is roughly divided into XYZ-to-CMY matrix conversion in step S250 and inverse response conversion in step S251.

Figures 22, 23:
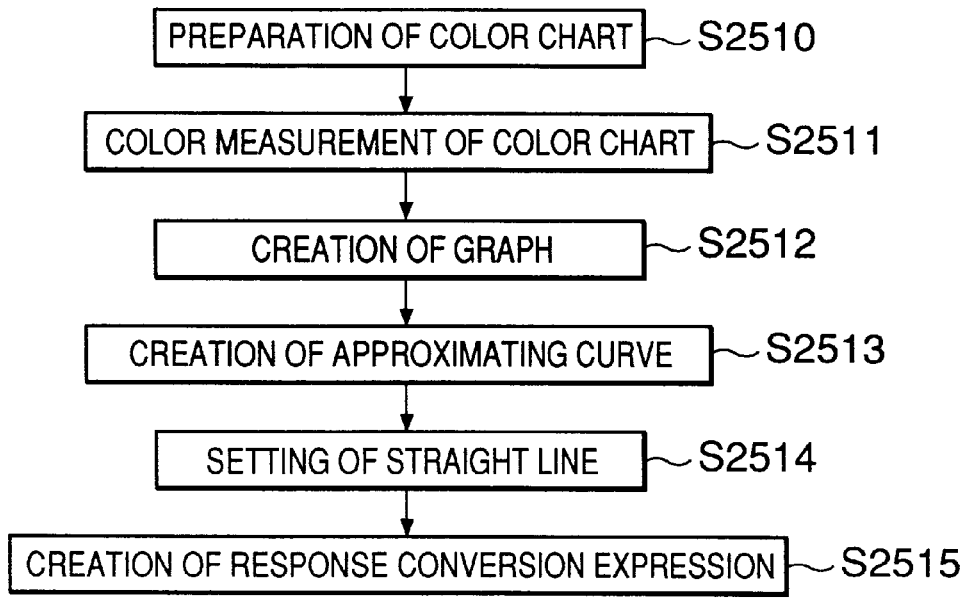
FIG. 22 is a diagram showing the procedure for creating the response conversion expression in the fifth embodiment.
FIG. 23 is a diagram illustrating the color sample data in the fifth embodiment.

The response conversion expression is obtained according to the procedure shown in FIG. 22. The inverse of the response conversion is the inverse response conversion (251).

Figure 24:
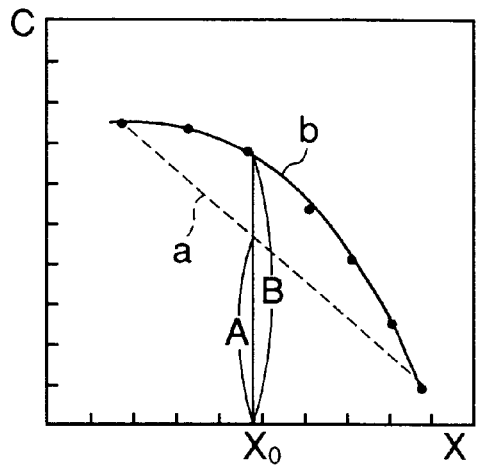
FIG. 24 is a diagram showing the color measurement results of the color samples in the fifth embodiment.

The setting of the response conversion expression will now be described in conjunction with FIG. 22 through FIG. 24. In step S2510 of FIG. 22, color charts including a plurality of color samples corresponding to CMY digital data such as shown in FIG. 23 are prepared. FIG. 23 shows the color components of a cyan-based color chart. It is assumed that each color component has 8-bit gradation. Hence, (C, M, Y)=(0, 0, 0) represents white, (C, M, Y)=(255, 0, 0) represents pure cyan with no other component, and (C, M, Y)=(255, 255, 255) represents black. FIG. 23 indicates the preparation of several levels of colors from white to black via a pure color (pure cyan in FIG. 23).

In this embodiment, only the color components of the cyan-based color chart are shown, whereas the color charts of other types are also prepared, namely, red, green, blue, magenta, yellow, and gray. The gray-based color chart provides the color samples of the colors from white to black via gray. In the case of a printer, the data of the color charts provide the CMY values for the printer.

In the next step S2511, the measurement of the color charts is carried out. The plurality of color samples which have been prepared in the step S2510 are measured using a calorimeter. The color measurement values based on the CIEXYZ color system are, thus, obtained.

Then, in step S2512 a graph is created. In this step, the graph is created according to the CMY values from step S2510 and the XYZ values obtained in step S2511. The data required for the response conversion are the CMY values of the gray-based color chart and the color measurement values of the color charts. From the data, graphs of C-X, M-Y (Y of CIEXYZ) and Y (Y of CMY)-Z are created. FIG. 24 shows X of the color measurement values on the abscissa and C of the CMY values on the ordinate. In the graph, the black dots indicate the data of the respective color samples of the color chart.

Then, in step S2513 an approximating curve is created. In this step, the approximating curve is obtained according to the plotted data using a statistical approach such as the nonlinear least squares method and the n-degree curve least squares method. Solid line b shown in FIG. 24 is the approximating curve.

In the following step S2514, a straight line is set. In this step, a straight line is set which passes through the read data values of the white and black color samples of the color chart. The short-dashed line of FIG. 24 represents the set straight line.

In the next step S2515, the creation of the response conversion expression is performed. FIG. 24 shows the graph which has been created by step S2512, the approximating curve created by step S2513, and the straight line set by step S2514. In this case, if the distance between the intersection point of the straight line drawn parallel to the ordinate C and the approximating curve b is taken as B and the distance between the intersection point of the straight line drawn parallel to the ordinate C and the set straight line a is taken as A, then the response conversion returns the value of A when the value of C=B is entered. Thus, the response conversion replaces the data on the approximating curve with the data on the straight line, and therefore, linearizes the achromatic and chromatic color components of a color signal. The replacing process for signal C of the printer is shown represented by a function in the response conversion expression (31-1).

Likewise, the response conversion expressions for signal M and signal Y can be obtained from the graphs M-Y (Y of CIEXYZ) and Y (Y of CMY)-Z. The inverse conversion of these response conversions is the inverse response conversion of step S251. The response conversion expression and the inverse response conversion expression are indicated by expression (31)

$$C'=f_C(C)$$

$$M'=f_M(M) \qquad (31\text{-}1)$$

$$Y'=f_Y(Y)$$

$$C=f_C^{-1}(C'')$$

$$M=f_M^{-1}(M'') \qquad (31\text{-}2)$$

$$Y=f_Y^{-1}(Y'')$$

The XYZ-to-CMY matrix conversion of step S250 will now be described. The XYZ-to-CMY matrix conversion of step S250 is the inverse conversion of the CMY-to-XYZ matrix conversion. Therefore, the CMY-to-XYZ conversion matrix will be obtained first.

Figure 25:
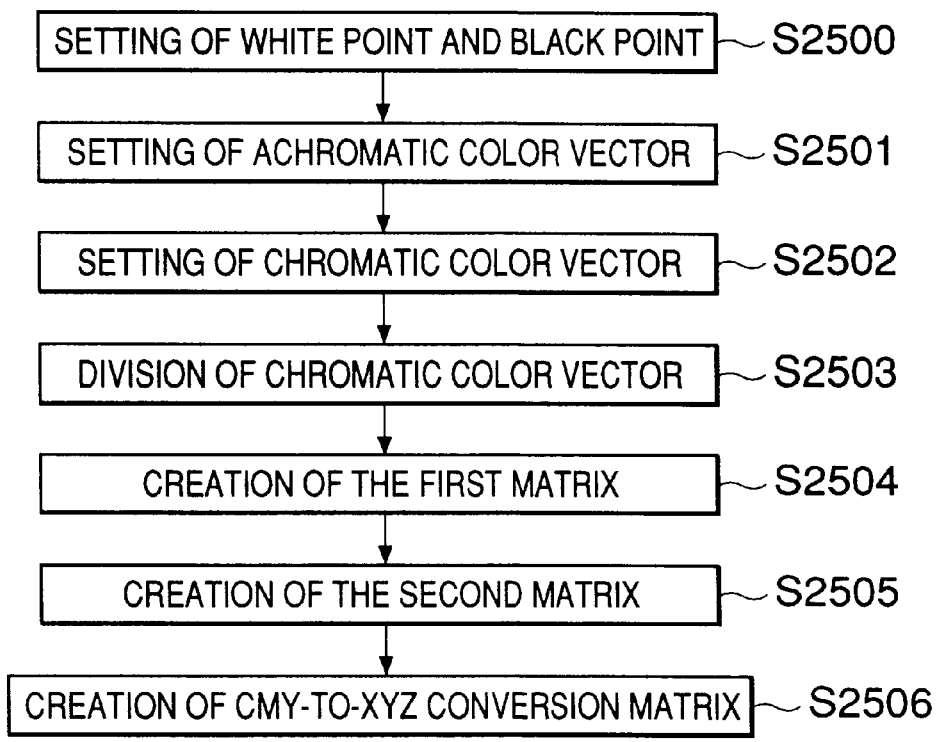
FIG. 25 is a diagram showing the procedure for creating the CMY-to-XYZ conversion matrix in the fifth embodiment.

FIG. 25 shows the procedure for creating the CMY-to-XYZ conversion matrix, and with reference to FIG. 25 through FIG. 29, the procedure for creating the CMY-to-XYZ conversion matrix will be described in detail.

Figure 26:
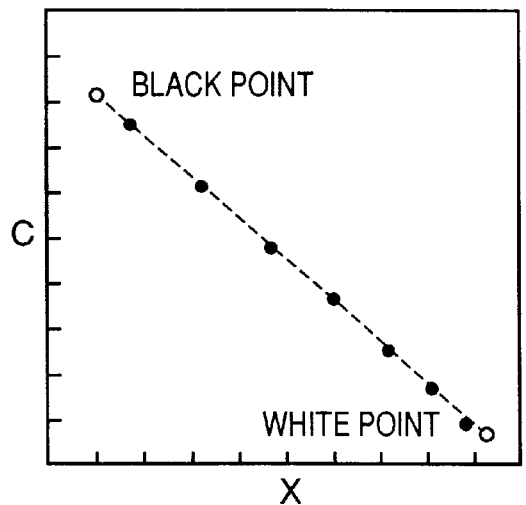
FIG. 26 is a diagram showing how to determine the black point and the white point in the fifth embodiment.

FIG. 26 illustrates a graph obtained by applying the response conversion expression (31) to the scanned values of the gray-system color charts. The CMY values which have been subjected to the response conversion are indicated by black points. Using the graph of FIG. 8, the white point and the black point of the printer are set in step S2500. Since the white and black point of the color samples of the color chart are not necessarily the limit colors which can be obtained by the printer, the white and black points are set by extrapolating the string of the measurement points (black dots).

Next, the setting of an achromatic color vector in step S2501 of FIG. 22 is carried out. It is assumed that the white point and the black point have been set as shown in expression (32) in the step S2500 for setting the white point and the black point. Each of the white and black points has two values, namely, the value in the CIEXYZ color space and the value in the CMY color space of the printer.

$$White = (W_X, W_Y, W_Z) = (W_C, W_M, W_Y)$$

$$Black = (Bk_X, Bk_Y, Bk_Z) = (Bk_C, Bk_M, Bk_Y) \quad (32)$$

An achromatic color vector m is then set as shown below by using the value of expression (32).

$$m = \{W_X - Bk_X, W_Y - Bk_Y, W_Z - Bk_Z\} \quad (33)$$

In the following step S2502, the setting of a chromatic color vector is carried out. The CMY values of the color samples of chromatic color systems (C system, M system, and Y system in the case of a printer) obtained in step S2510 are converted using the response conversion expression (30) to create the same type of graph as shown in FIG. 24. The cyan point, the magenta point, and the yellow point are set as shown in expression (34) in the same manner as that for the setting of the white point and the black point in step S2500.

$$Cyan = (C_X, C_Y, C_Z) = (C_C, C_M, C_Y)$$

$$Magenta = (M_X, M_Y, M_Z) = (M_C, M_M, M_Y) \quad (34)$$

$$Yellow = (Y_X, Y_Y, Y_Z) = (Y_C, Y_M, Y_Y)$$

Vectors are then determined by using expression (34). An example of only the cyan vector is given in expression (35); however, the same procedure is used also to determine the vectors for magenta and yellow.

$$C_{at\ CIEXYZ} = \{C_X - Bk_X, C_Y - Bk_Y, C_Z - Bk_Z\} \quad (35\text{-}1)$$

$$C_{at\ printerCMY} = \{C_C - Bk_C, C_M - Bk_M, C_Y - Bk_Y\} \quad (35\text{-}2)$$

Next, the vector in the CIEXYZ color space (expression 35-1) is divided by the vector in the printer CMY color space (expression 35-2) and the resulting vector is set as the chromatic color vector (expression 36).

$$e_C = C_{at\ CIEXYZ}/\text{LEN}(C_{at\ printerCMY}) \quad (36)$$

Figure 27:
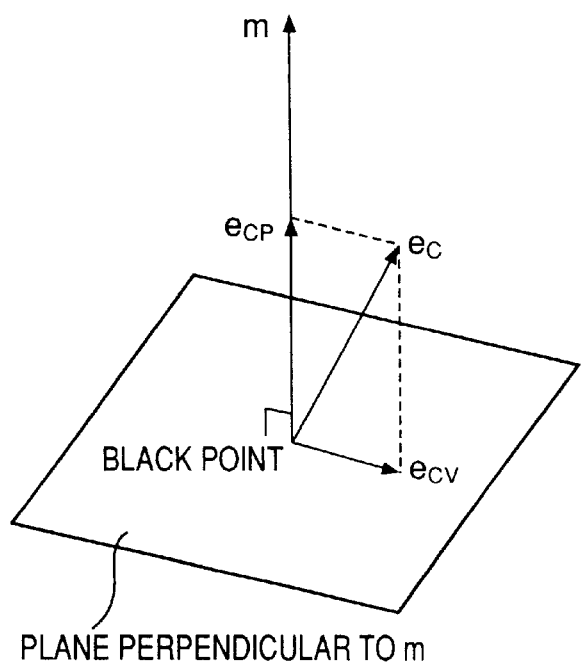
FIG. 27 is a diagram illustrating how to divide a vector in the fifth embodiment.
Figure 28:
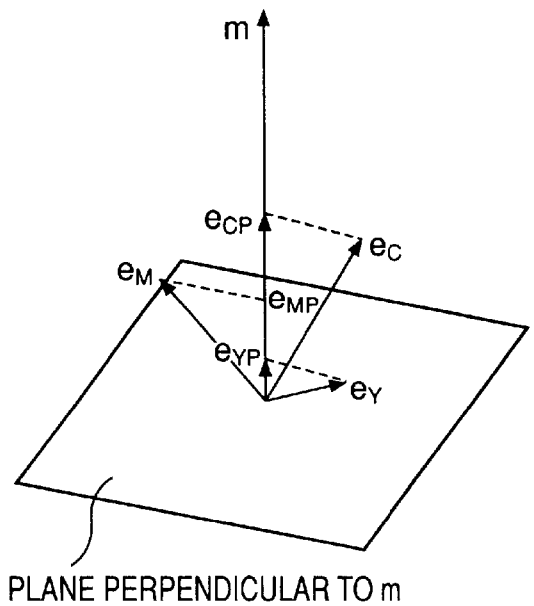
FIG. 28 is a diagram illustrating the components in the direction of vector m in the fifth embodiment.

Then, in step S2503 of FIG. 25 the chromatic color vector is divided. In general, once the decomposing direction of the vector is decided, the vector can be divided into a plurality of vectors. In this case, as shown in FIG. 27, the chromatic color vector is decomposed into vector ($e_{CP}$) which is parallel to achromatic color vector m and vector ($e_{CV}$) on a plane which is perpendicular to achromatic color vector m. The same decomposing process applies to chromatic vectors for magenta M and yellow Y.

Next, in step S2504 the first matrix is created. The division of the chromatic in step S2503 color vector has rendered three vectors ($e_{CP}$, $e_{MP}$, and $e_{YP}$ shown in FIG. 28). A constant k which satisfies expression (37) will now be determined.

$$m = k\{(W_C - Bk_C)e_{CP} + (W_M - Bk_M)e_{MP} + (W_Y - Bk_Y)e_{YC}\} \quad (37)$$

From constant k, the first matrix $M_1$ is created according to expression (38).

$$M_1 = k(e_{CP}, e_{MP}, e_{YP}) \quad (38)$$

The first matrix M1 is the achromatic color component conversion matrix as in the case of the first embodiment of the invention.

Figure 29:
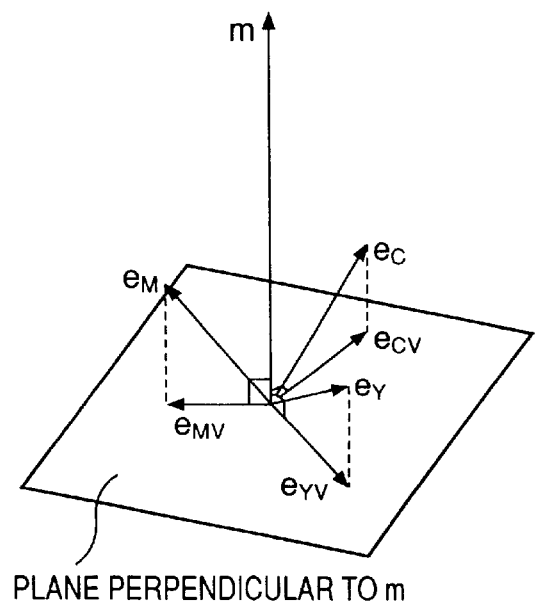
FIG. 29 is a diagram illustrating the components in a direction which is perpendicular to vector m in the fifth embodiment.

Next, in step S2505 of FIG. 25 the second matrix is created. The division of the chromatic color vector in step S2503 has rendered the three vectors ($e_{CV}, e_{MV},$ and $e_{YV}$) as shown in FIG. 29 which are perpendicular to achromatic color vector m. In this case, for the CMY value of the achromatic color, vectors e'$_{CV}$, e'$_{MV}$, and e'$_{YV}$ are determined so that expression (39) given below is satisfied. These vectors e'$_{CV}$, e'$_{MV}$, and e'$_{YV}$, respectively, correspond to the vertical vectors $e_{CV}, e_{MV},$ and $e_{YV}$. Vectors e'$_{CV}$, e'$_{MV}$, and e'$_{YV}$ are also determined under a restricted condition (expression 40) where a minimum sum of the respective variations is obtained.

$$(W_C - Bk_C)e'_{CV} + (W_M - Bk_M)e'_{MV} + (W_Y - Bk_Y)e'_{YV} = 0 \quad (39)$$

$$\text{Variation} = \text{LEN}(e'_{CV}, e_{CV}) + \text{LEN}(e'_{MV}, e_{MV}) + \text{LEN}(e'_{YV}, e_{YV}) \quad (40)$$

Using vectors e'$_{CV}$, e'$_{MV}$, and e'$_{YV}$ obtained by expression (39), the second matrix $M_2$ shown in expression (41) is determined.

$$M_2 = (e'_{CV}, e'_{MV}, e'_{YV}) \quad (41)$$

The second matrix $M_2$ represents the chromatic color component conversion matrix as in the first embodiment of the invention.

In the next step S2506, the CMY-XYZ conversion matrix is created. In this step, matrixes M1 and M2 are added to generate the CMY-XYZ conversion matrix M.

$$M = M1 + M2 \quad (42)$$

As understood from the meaning of the first matrix M1 and the second matrix M2, even when an achromatic color vector is converted using the CMY-to-XYZ conversion matrix M, the converted vector and the achromatic vector make parallel vectors having black start points. In other words, the CMY-to-XYZ conversion matrix M is a matrix having an achromatic color vector as the specific vector thereof. For this reason, the CMY value on the achromatic color vector in the CMY color space of a printer is always converted on an achromatic color vector in the CIEXYZ color space.

The XYZ-to-CMY matrix conversion of step S250 is then implemented using $M^{-1}$ which is the inverse matrix of the obtained CMY-to-XYZ conversion matrix M.

By implementing the procedure stated above, the expressions for representing the color characteristics of the scanner and the printer have been obtained. These expressions are used to actually correct colors. The specific procedure is the same as the correcting procedure described in the first to fourth embodiments of the invention, and therefore will not be repeated.

According to the fifth embodiment of the invention, the printer CMY data obtained in step S26, by undergoing the color correcting process, retains the achromatic color axis of the scanner and the achromatic color axis of the printer unchanged, thus enabling production of an image with good color balance.

The sixth embodiment of the invention will now be described. The sixth embodiment of the invention relates to a color image system comprised of a single or a plurality of image input units and a single or a plurality of image output unit. For instance, the image input units may include a scanner, and the image output units may include a monitor and a printer.

FIG. 30 shows an example of the color image system. A variety of combinations are possible for the transfer of the color image data on the color image input/output equipment as shown in FIG. 30. Such combinations are, for example, from a scanner 40 to printer A 41, from the scanner 40 to monitor A 42, from monitor A 42 to printer A 41, from monitor A 42 to monitor B 44, from monitor A 42 to printer B 43, and from monitor B 44 to monitor A 42. The color correction related to the transfer of the color image data for the variety of combinations is carried out using the color characteristic data shown in FIG. 31.

The first embodiment of the invention and the fifth embodiment of the invention have shown the method for reducing the color characteristics of image equipment such as a scanner, printer, and monitor into expressions. Accordingly, the data for converting the three components (RGB or CMY) of color image data into CIEXYZ and the data for converting the inverse conversion data, namely, CIEXYZ, into the three components of color image data have been acquired. The former is referred to as the conversion data in the forward direction and the latter is referred to as the conversion data in the reverse direction. The scanner 40, the printers 41, 43, and the monitors 42, 44 shown in FIG. 30 store both forward and reverse information on the color characteristic expressions as the color characteristic data of the image equipment as shown in FIG. 31.

The actual color correction is implemented in the following manner. For instance, when sending image data from monitor A 42 to printer A 41, the color characteristic data on monitor A 42 and the color characteristic data on printer A 41 are prepared. The color characteristic data in the forward direction on monitor A 42 is combined with the color characteristic data in the reverse direction on printer A (41) to implement the color correction according to the procedure shown in the first to fifth embodiments of the present invention.

Likewise, when sending image data from monitor A 42 to monitor B 44, the color characteristic data in the forward direction on monitor A 42 is combined with the color characteristic data in the reverse direction on monitor B 44 to implement the color correction according to the procedure shown in the first to fifth embodiments of the present invention.

According to the sixth embodiment of the invention, the color characteristic data on various image equipment are divided into the forward-direction data and the reverse-direction data before they are stored so that depending on the direction in which image data is sent, the forward-direction color characteristic data of one piece of image equipment may be combined with the reversed direction color characteristic data of another piece of image equipment; thus, making it possible to successfully deal with various combinations of image equipment.

Further, in the same model, the reproduction of image data which has been acquired in the past is not affected by time-dependent changes. When an image has been taken, the obtained characteristic data is stored and when an image is actually output, the most up-to-date color characteristic data is created. The created characteristic data is combined with the stored color characteristic data, thus making it possible to correct a time-dependent color change in the same model.

Furthermore, as in the example of monitor A 42 and monitor B 44, a difference in color characteristics between different models can also be corrected.

The seventh embodiment of the invention will now be described. The seventh embodiment of the invention relates to a method for adjusting conversion matrix M. Accordingly, the seventh embodiment has the same structure as in, for example, FIG. 1.

Figure 32:
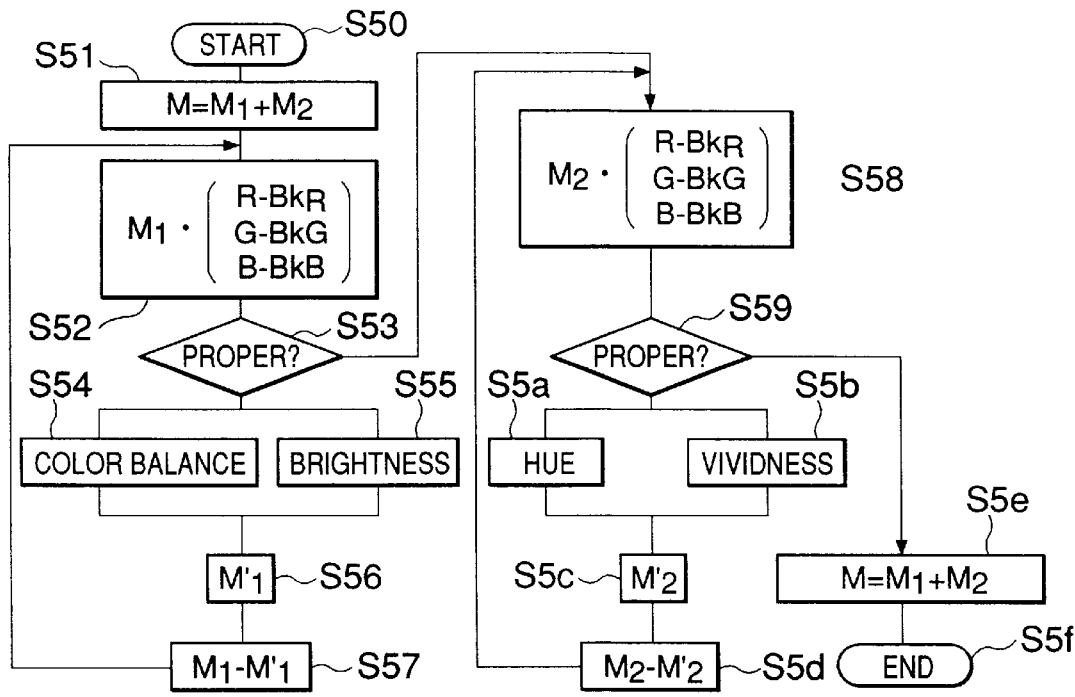
FIG. 32 is a diagram showing the procedure for performing color adjustment according to a seventh embodiment of the present invention.

FIG. 32 shows the procedure carried out by the color correction unit 2 in performing the color adjustment of the seventh embodiment of the invention.

The procedure begins with step S50. Matrix M obtained in the first embodiment of the invention and in the fifth embodiment of the invention can be separated into achromatic color component conversion matrix M1 and chromatic color component conversion matrix M2.

In step S51, matrix M is separated into achromatic color component conversion matrix M1 and chromatic color component conversion matrix M2.

In step S52, image data (R, G, B) is subjected to matrix operation using achromatic color component conversion matrix M1 to obtain an achromatic color component conversion image. In this case, data ($Bk_R$, $Bk_G$, $Bk_B$) corresponds to the black points shown in expression (8) and expression (32). Then, the program proceeds to step S53 for evaluating the achromatic color conversion image.

In step S53, the evaluation is implemented with an emphasis placed on the degree of the achromatic color (whether it is tinted or not; and which color it is tinted if any) and the degree of brightness (whether the brightness is proper or not; and whether too bright or dark if the brightness is not proper). The evaluation is carried out using a calorimeter or by reducing subjective evaluation into numeric values.

If the result of the evaluation in step S53 indicates that the achromatic color component image is improper, then the color balance is adjusted in step S54 and/or the brightness is adjusted in step S55 so as to change achromatic color component conversion matrix M1.

If the achromatic color conversion image has been determined to be proper, then the process proceeds to step S58.

The following describes steps S54 and step S55 in FIG. 32. The achromatic color component conversion matrix M1 is defined by expression (14). Each column of achromatic color component conversion matrix M1 is related to a vector parallel to achromatic color vector m which has been acquired by decomposing a chromatic color vector. It is assumed that achromatic color component conversion matrix M1 is represented by expression (43).

$$M1=(e_1, e_2, e_3) \qquad (43)$$

Vectors $e_1$, $e_2$, and $e_3$ have the relationship represented by expression (44).

$$e_1 = k e_{RP}$$
$$e_2 = k e_{GP} \qquad (44)$$
$$e_3 = k e_{BP}$$

Figure 33:
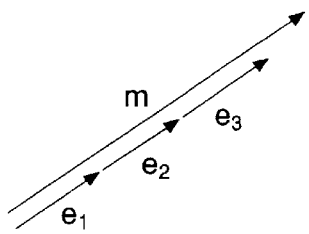
FIG. 33 is a diagram showing the relationship between achromatic color vector m and vectors $e_1$, $e_2$, and $e_3$ in the seventh embodiment.

Achromatic color vector m and vectors $e_1$, $e_2$, $e_3$ can be represented by a diagram of FIG. 33. More specifically, vectors $e_1$, $e_2$, and $e_3$ are parallel to achromatic color vector m. Vectors $e_1$, $e_2$, and $e_3$ are the vectors of the respective columns of achromatic color component conversion matrix M1; therefore, the nature of the conversion of achromatic color component conversion matrix M1 can be changed by changing the three vectors.

The following will describe how changing the vectors $e_1$, $e_2$, $e_3$ influences the conversion nature of achromatic color component conversion matrix M1.

(1) Assume the ratio of the magnitudes of vectors $e_1$, $e_2$, and $e_3$ is changed. The changed vectors are indicated as $e'_1$, $e'_2$, and $e'_3$, and are set so that the condition of expression (45) is satisfied.

$e_1+e_2+e_3=e'_1+e'_2+e'_3 e_1$ and $e'_1$ are in parallel (including the directions)

$e_2$ and $e'_2$ are in parallel (including the directions) \qquad (45)

$e_3$ and $e'_3$ are in parallel (including the directions)

Figure 34:
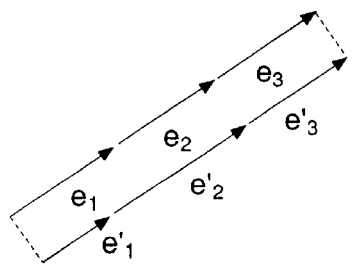
FIG. 34 is a diagram showing the relationship between vectors $e_1$, $e_2$, $e_3$ and $e'_1$, $e'_2$, $e'_3$ after changing the magnitude of vectors $e_1$, $e_2$, and $e_3$ in the seventh embodiment.

Expression (45) represents the relationship shown in FIG. 34. In this case, the white points and the black points do not change, but the color balance of the intermediate part, namely, the gray portion, does change. In other words, to change the intermediate gray balance, the ratio of vectors $e_1$, $e_2$, and $e_3$ is changed to satisfy expression (45).

(2) Assume the white point is changed and the directions of vectors $e_1$, $e_2$, and $e_3$ are changed. The changed vectors are indicated as $e'_1$, $e'_2$, and $e'_3$ and are set so that the condition of expression (46) is satisfied.

$$LEN(e_1)=LEN(e'_1)$$
$$LEN(e_2)=LEN(e'_2) \qquad (46)$$
$$LEN(e_3)=LEN(e'_3)$$

$e'_1$, $e'_2$, $e'_3$, and m' are in parallel (including the directions).

Figure 35:
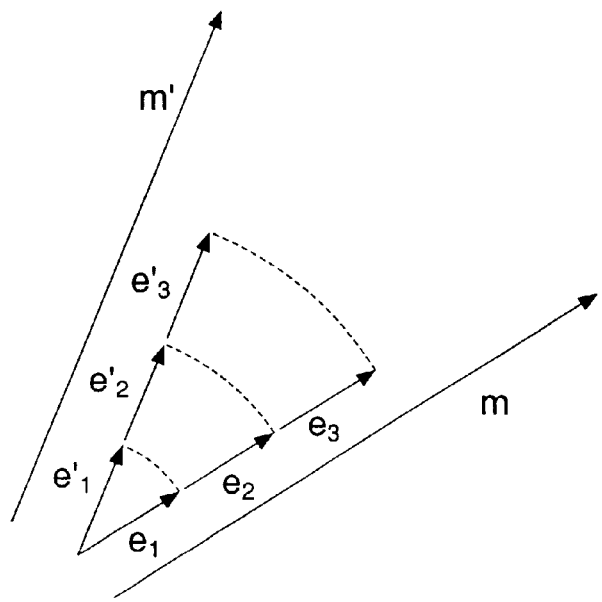
FIG. 35 is a diagram showing the relationship between vectors $e_1$, $e_2$, $e_3$ and $e'_1$, $e'_2$, $e'_3$ after rotating vectors $e_1$, $e_2$, $e_3$ with point n as the pivot point, in the seventh embodiment.

Expression (46) represents the relationship given in FIG. 35. Specifically, FIG. 35 shows the rotation of vectors $e_1$, $e_2$, and $e_3$ about the black point. Accordingly, the black point does not change, but the white point does change. This also causes the achromatic color vector to turn with the black point as the center thereof. The change in the color balance of the intermediate gray portion increases toward the white point. In other words, to change the balance of a color close to the white point without changing the balance of a color close to the black point, the directions of vectors e1, e2, and e3 are changed to satisfy expression (46).

(3) Assume the black point is changed and the directions of vectors $e_1$, $e_2$, and $e_3$ are changed. The changed vectors are indicated as $e'_1$, $e'_2$, and $e'_3$ and are set so that the condition of expression (47) is satisfied.

$$LEN(e_1)=LEN(e'_1)$$
$$LEN(e_2)=LEN(e'_2) \qquad (47)$$
$$LEN(e_3)=LEN(e'_3)$$

$e'_1$, $e'_2$, $e'_3$, and m' are in parallel (including the directions).

Figure 36:
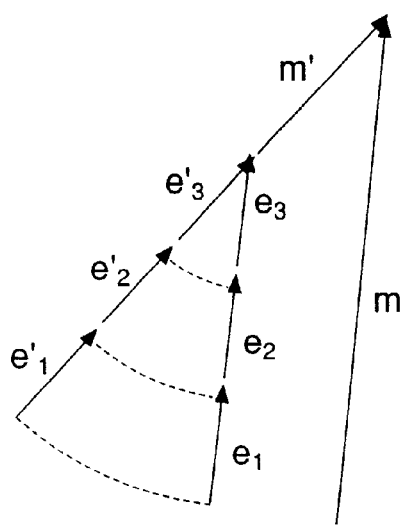
FIG. 36 is a diagram showing the relationship between vectors $e_1$, $e_2$, $e_3$ and $e'_1$, $e'_2$, $e'_3$, after rotating vectors $e_1$, $e_2$, $e_3$ with the terminal point as the pivot point, in the seventh embodiment.

Expression (47) represents the relationship shown in FIG. 36. Specifically, FIG. 36 shows the rotation of vectors $e_1$, $e_2$, and $e_3$ about the white point. Accordingly, the white point does not, but the black point does change. This also causes the achromatic color vector to turn with the white point as the center thereof. The change in the color balance of the intermediate gray portion increases toward the black point. In other words, to change the balance of a color close to the black point without changing the balance of a color close to the white point, the directions of vectors $e_1$, $e_2$, and $e_3$ and the black point are changed.

(4) Assume the white point is changed and the magnitudes of vectors $e_1$, $e_2$, and $e_3$ are changed. The changed vectors are indicated as $e'_1$, $e'_2$, and $e'_3$ and are set so that the condition of expression (48) is satisfied. Reference character "k" means the coefficient of the expansion or contraction of the achromatic color vectors caused by changing the white point.

$$m'=km$$
$$e_1'=ke_1, e_2'=ke_2, e_3'=ke_3 \qquad (48)$$

Figure 37:
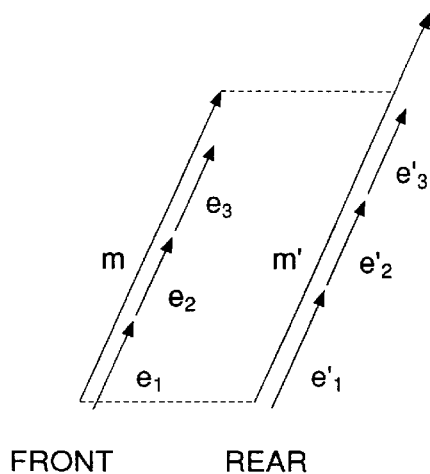
FIG. 37 is a diagram showing the relationship between vectors $e_1$, $e_2$, $e_3$ and $e'_1$, $e'_2$, $e'_3$, after changing the magnitude of achromatic color vector m which shares the same point n in the seventh embodiment.

Expression (48) indicates the relationship shown in FIG. 37. The relationship illustrated is obtained when each of vectors $e_1$, $e_2$, and $e_3$ is multiplied by a constant. Accordingly, the black point does not change, but the white point does change. This causes the achromatic color vectors to expand or contract with the black point remaining fixed. The coefficient of the expansion and contraction remains the same, whereas the magnitude of the expansion and contraction reaches the maximum value at the white point. Although the gray portion also expands or contracts uniformly, the color balance remains unchanged. This means that implementing this operation enables the brightness of a color near the white point to change. In other words, changing only the brightness of a color near the white point can be accomplished simply by changing the magnitudes of vectors $e_1$, $e_2$, and $e_3$ to satisfy expression (48) and by changing the white point.

(5) Assume the black point is changed and the magnitudes of vectors $e_1$, $e_2$, and $e_3$ are changed. The changed vectors are indicated as $e'_1$, $e'_2$, and $e'_3$ and are set so that the condition of expression (49) is satisfied. Reference character "k" means the coefficient of the expansion or contraction of the achromatic color vectors caused by changing the black point.

$$m'=km$$
$$e_1'=ke_1, e_2'=ke_2, e_3'=ke_3 \qquad (49)$$

Figure 38:
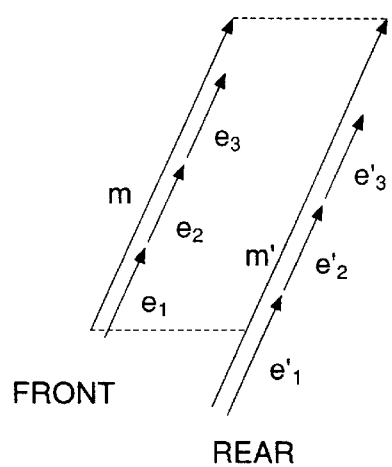
FIG. 38 is a diagram showing the relationship between vectors $e_1$, $e_2$, $e_3$ and $e'_1$, $e'_2$, $e'_3$, after changing the magnitude of achromatic color vector m which shares the same terminal point, in the seventh embodiment.

Expression (49) indicates the relationship shown in FIG. 38. The relationship shown in FIG. 38 is obtained when each of vectors $e_1$, $e_2$, and $e_3$ is multiplied by a constant. The white point does not change, but the black point does change. This causes the achromatic color vectors to expand or contract with the white point remaining fixed. The coefficient of the expansion and contraction remains the same, whereas the magnitude of the expansion and contraction reaches the maximum value at the black point. Although the gray portion also expands or contracts uniformly, the color balance remains unchanged. This means that implementing this operation enables the brightness of a color near the black point to change. In other words, changing only the brightness of a color near the black point can be accomplished simply by changing the magnitudes of vectors $e_1$, $e_2$, and $e_3$ to satisfy expression (49) and by changing the black point.

According to the evaluation result given in step S53, the processing of either one or both of steps S54 and S55 is carried out. In step S54, the processing in (1), (2), and (3) discussed above is implemented.

Likewise, in step S55, the processing in (4) and (5) discussed above is performed.

In step S56, adjustment matrix $M'_1$ is obtained from vectors $e'_1$, $e'_2$, and $e'_3$, which have been acquired in step S55, according to expression (50).

$$M1'=(e_1', e_2', e_3') \qquad (50)$$

In step S57, adjustment matrix $M'_1$ obtained in step S56 is substituted for matrix $M_1$. After that, the processing returns to step S52. Then, the processing loop of steps S52, S53, S54, S55, S56, S57 is repeated until proper evaluation is given in step S53.

When the evaluation in step S53 is determined to be proper, the processing proceeds to step S58. In step S58, the image data (R, G, B) is subjected to matrix operation using chromatic color component conversion matrix M, to obtain a chromatic color component conversion image. The data ($Bk_R$, $Bk_G$, $Bk_B$) indicates the black points shown in expression (8) and expression (32). The processing then proceeds to step S59 for evaluation of the chromatic color conversion image.

In step S59, the evaluation is implemented with an emphasis placed on the degree of vividness and the degree of hue (whether the color has been properly reproduced; and which color it is deflected to if it has not been properly reproduced). The evaluation is carried out using a calorimeter or by reducing subjective evaluation to numeric values. If the result of the evaluation in step S59 indicates that the achromatic color conversion image is improper, then the hue is adjusted in step S5a and the vividness is adjusted in step S5b to change the achromatic color component conversion matrix $M_2$. If it is determined that the chromatic color conversion image is proper, then processing proceeds to step S5e.

The following describes steps S5a and S5b.

The chromatic color component conversion matrix $M_2$ is defined by expression (20). The respective columns of the chromatic color component conversion matrix $M_2$ are composed of the vectors which satisfy expression (51) in relation to color vector m. If the black point or the white point is changed in step S54 or step S55, then the chromatic color component matrix $M_2$ is redetermined from matrix M. Therefore, the chromatic color component conversion matrix $M_2$ is different from chromatic color component $M_2$ acquired in step S51.

$$(W_R-Bk_R)e'_{RV}+(W_G-Bk_G)e'_{GV}+(W_B-Bk_B)e'_{BV}=0 \quad (51)$$

It is assumed that chromatic color component conversion matrix $M_2$ is represented by expression (52).

$$M_2=(e_4,e_5,e_6) \quad (52)$$

Vectors $e_4$, $e_5$, and $e_6$ have the relationship represented by expression (53).

$$e_4=ke'_{RV}$$
$$e_5=ke'_{GV} \quad (53)$$
$$e_6=ke'_{BV}$$

Figure 39:
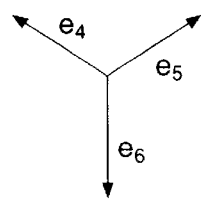
FIG. 39 is a diagram showing the relationship between vectors $e_4$, $e_5$, and $e_6$ in the seventh embodiment.

Vectors $e_4$, $e_5$, and $e_6$ can be represented diagrammatically as shown in FIG. 39. More specifically, vectors $e_4$, $e_5$, and $e_6$ are on the same plane. Vectors $e_4$, $e_5$, and $e_6$ are the elements of the chromatic color component conversion matrix $M_2$; therefore, the nature of the conversion of the chromatic color component conversion matrix $M_2$ can be changed by changing the three vectors.

The following will describe how changing vectors $e_4$, $e_5$, and $e_6$ influences the conversion nature of the chromatic color component conversion matrix $M_2$.

(6) Assume the directions of all vectors $e_4$, $e_5$, and $e_6$ are changed. The changed vectors are indicated as $e'_4$, $e'_5$, and $e'_6$ and are set so that the condition of expression (54) is satisfied.

$$(W_R-Bk_R)e'_4+(W_G-Bk_G)e'_5+(W_B-Bk_B)e'_6=0$$
$$LEN(e_4)=LEN(e'_4)$$
$$LEN(e_5)=LEN(e'_5) \quad (54)$$
$$LEN(e_6)=LEN(e'_6)$$

$(e_4 \times e'_4)$, $(e_5 \times e'_5)$, and $(e_6 \times e'_6)$ are in parallel, wherein "x" denotes the outer product of the vectors.

Figure 40:
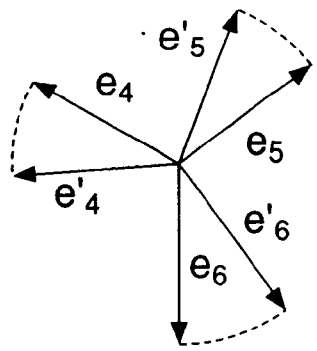
FIG. 40 is a diagram showing the relationship between vectors $e_4$, $e_5$, $e_6$ and $e'_4$, $e'_5$, $e'_6$, after rotation, in the seventh embodiment.

Expression (54) represents the relationship shown in FIG. 40. Vectors $e_4$, $e_5$, $e_6$ and vectors $e'_4$, $e'_5$, $e'_6$ are on the same plane. Vectors $e'_4$, $e'_5$, and $e'_6$ are obtained by turning vectors $e_4$, $e_5$, and $e_6$. In this case, the hue is uniformly turned. In other words, the whole hue can be changed by changing the directions of vectors $e_4$, $e_5$, and $e_6$.

(7) Assume the magnitudes of vectors $e_4$, $e_5$, and $e_6$ are changed. The changed vectors are indicated as $e'_4$, $e'_5$, and $e'_6$ and are set so that the condition of expression (55) is satisfied. Reference character "k" denotes the coefficient of the expansion or contraction of vectors $e_4$, $e_1$, and $e_6$.

$$(W_R-Bk_R)e'_4+(W_G-Bk_G)e'_5+(W_B-Bk_B)e'_6=0$$
$$e'_4=ke_4, e'_5=ke_5, e'_6=ke_6 \quad (55)$$

Figure 41:
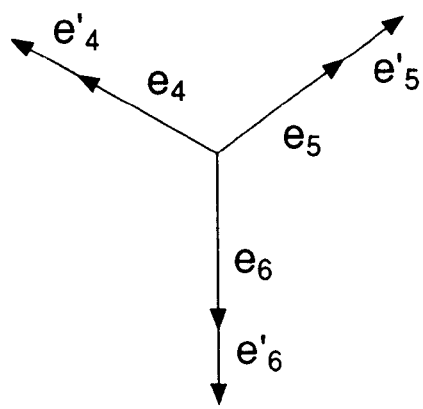
FIG. 41 is a diagram showing the relationship between vectors $e_4$, $e_5$, $e_6$ and $e'_4$, $e'_5$, $e'_6$, after changing the magnitudes of vectors $e_4$, $e_5$, and $e_6$, in the seventh embodiment.

The relationship represented by expression (55) is shown in FIG. 41. Vectors $e_4$, $e_5$, $e_6$ and vectors $e'_4$, $e'_5$, $e'_6$ are on the same plane. Vectors $e'_4$, $e'_5$, and $e'_6$ are obtained by multiplying vectors $e_4$, $e_5$, and $e_6$ by k. In this case, the vividness is uniformly changed. When k=0, no vividness exists. In other words, the whole vividness can be changed by changing the magnitudes of vectors $e_4$, $e_5$, and $e_6$.

(8) Assume the directions and magnitudes of vectors e4, e5, and e6 are individually changed. In (6) and (7) discussed above, vectors e4, e5, and e6 were changed uniformly, whereas in (8) these vectors can also be changed separately. In this case also, the separation from the achromatic color component conversion matrix M1 can be retained by making the change so that the condition of expression (56) is satisfied.

$$(W_R-Bk_R)e'_4+(W_G-Bk_G)e'_5+(W_B-Bk_B)e'_6=0 \quad (56)$$

Changing the magnitudes of the respective vectors changes the vividness and changing the directions of the vectors changes the hue. Hence, to change the vividness or hue of a particular color portion according to the evaluation in step S59, the vector near that color is changed. For example, if the color is red, then the vector related to vector $e_R$ is adjusted or if the adjustment is made using complementary colors, then the vectors related to vectors $e_B$ and $e_G$ are adjusted and other vectors are changed so as to minimize the variation.

According to the evaluation result given in step S59, the processing of either one or both of steps S5a and S5b is carried out. In step S5a, the processing in (6) and (8) is implemented. Likewise, in step S5b, the processing in (7) and (8) is performed.

In step S5c, adjustment matrix M'$_2$ is obtained from vectors $e'_4$, $e'_5$, and $e'_6$, which have been acquired in steps S5a and step S5b, according to expression (57).

$$M2'=(e1',e2',e3') \quad (57)$$

In step S5d, adjustment matrix M'$_2$ obtained in step S5c is substituted for $M_2$. After that, processing returns to step S58. Then, the processing loop of step S58, S59, S5a, S5b, S5c, and S5d is repeated until proper evaluation is given in step S59.

When the evaluation in step S59 is proper, processing proceeds to step S5e. In step S5e, matrix M is determined from adjustment matrices $M_1$ and $M_2$. The matrix thus obtained is separated into the achromatic color component conversion matrix and the chromatic color component conversion matrix; therefore, an achromatic color is converted to an achromatic color, thus allowing a chromatic color to be converted without being affected by an achromatic color.

The color characteristics of the various pieces of image equipment are represented using the matrices obtained in step S5e and the actual color correction is implemented using the method described in the first embodiment, etc. of the present invention.

Thus, according to the seventh embodiment, conversion matrix M can be adjusted according to the evaluation result, so that proper color correction can be achieved. Furthermore, matrix M is separated into achromatic color component conversion matrix $M_1$ and chromatic color component conversion matrix $M_2$ in performing the adjustment; therefore, the adjustment for an achromatic color can be independently carried out from the adjustment for a chromatic color. This is another advantage, namely, easier adjustment.

The eighth embodiment of the invention will now be described.

In the first to seventh embodiments of the invention, the method for creating the achromatic color component conversion matrix and the chromatic color component conversion matrix from measurement data and also the method for implementing color correction by using the measurement data has been described. In the eighth embodiment of the invention, a description will be given to a specific method for applying these methods, which is used to separate the achromatic color component matrix and the chromatic color component matrix, to an image system which is color corrected according to a well-known color correction matrix A.

It is assumed that the color correction represented by expression (58) is being implemented in an image system.

$$\begin{pmatrix} X \\ Y \\ Z \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad (58)$$

The vectors of the three columns of matrix A are indicated by $A_1$, $A_2$, and $A_3$. This is shown in expression (59)

$$A_1 = (a_{11}, a_{21}, a_{31})$$
$$A_2 = (a_{12}, a_{22}, a_{32}) \quad (59)$$
$$A_3 = (a_{13}, a_{23}, a_{33})$$

Vector n indicates the sum of column vectors $A_1$, $A_2$, and $A_3$. Vector n corresponds to achromatic color vector m.

$$n = A_1 + A_2 + A_3 \quad (60)$$

Then, column vectors $A_1$, $A_2$, and $A_3$ are decomposed in the direction of vector n and a direction which is perpendicular thereto. It is assumed that the vectors are decomposed as shown by expression (61).

$$A_1 = A_{1P} + A_{1V}$$
$$A_2 = A_{2P} + A_{2V} \quad (61)$$
$$A_3 = A_{3P} + A_{3V}$$

In general, parallel vectors $A_{1P}$, $A_{2P}$, and $A_{3P}$ of expression (61) do not satisfy the condition corresponding to expression (13) and vertical vectors $A_{1V}$, $A_{2V}$, and $A_{3V}$ do not satisfy the condition corresponding to expression (18); therefore, the parallel vectors and the vertical vectors are adjusted to satisfy these conditions. For this purpose, the method described in the first embodiment of the invention is employed. The vectors obtained after the adjustment are represented by expression (62).

$$A'_{1P}, A'_{2P}, A'_{3P} \ldots \text{Parallel vectors}$$
$$A'_{1V}, A'_{2V}, A'_{3V} \ldots \text{Vertical vectors} \quad (62)$$

Two matrices, which have the vectors given in expression (62) as the column vectors, are considered.

$$A'_P = (A'_{1P}, A'_{2P}, A'_{3P})$$
$$A'_V = (A'_{1V}, A'_{2V}, A'_{3V}) \quad (63)$$

These two matrices $A'_P$ and $A'_V$ are composed of the vectors which satisfy expression (13) and expression (18); therefore, matrix $A'_P$ is an achromatic color component conversion matrix and matrix $A'_V$ is a chromatic color component conversion matrix.

$$A' = A'_P + A'_V \quad (64)$$

As shown in expression (64), the matrix resulting from adding the achromatic color component conversion matrix and the chromatic color component conversion matrix is defined as color correction matrix A'. The matrix thus defined makes it possible to adjust a color by the color adjusting approach shown in the seventh embodiment of the invention. Further, actual color correction can be accomplished by using the adjusted matrix.

The ninth embodiment of the invention will now be described. The ninth embodiment of the invention relates to a specific hardware configuration for implementing the color correcting methods of the first to eighth embodiments of the invention described above.

Figure 42:
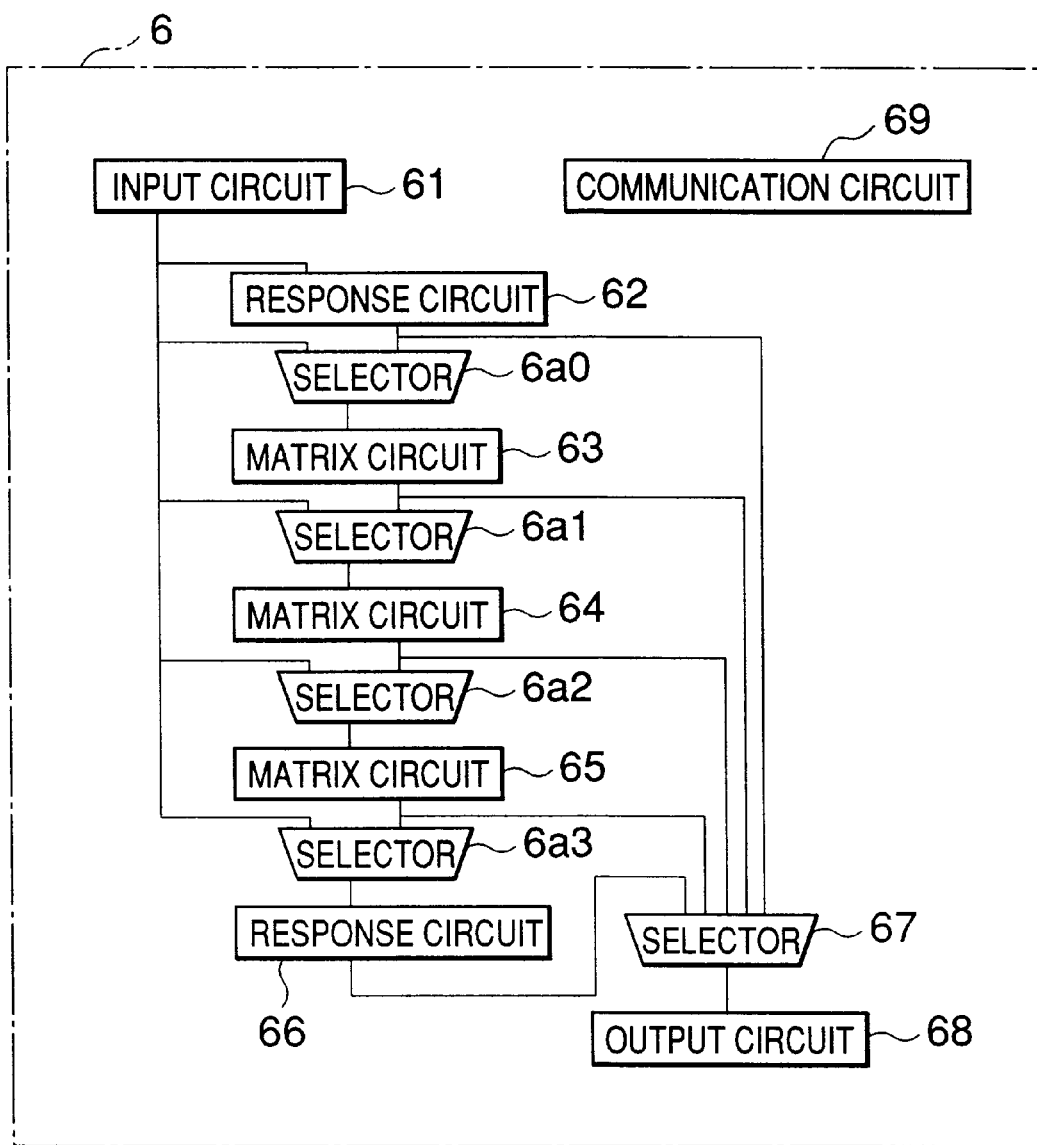
FIG. 42 is a block diagram of a color converting circuit according to a ninth embodiment of the present invention.

FIG. 42 shows a circuit block diagram of the ninth embodiment of the invention. In FIG. 42, an input circuit 61 receives image data from an external device, a response circuit 62 carries out the response conversion on the image data, a matrix circuit 63 connected to the response circuit 62 implements the matrix conversion, a matrix circuit 64 connected to the matrix circuit 63 via selector 6a0, implements the matrix conversion for color adjustment, a matrix circuit 65 connected to the matrix circuit 64 via selector 6a2 implements inverse matrix conversion, a response circuit 66 connected to the matrix circuit 65 via selector 6a3 implements on inverse response, a selector 67 selects a single input from among a plurality of inputs from the response circuit 62, matrix circuits 63–65, and the response circuit 66, an output circuit 68 sends out image data to the external device, a communication circuit 67 controls the communication with a control unit (not shown) such as a CPU, and 2-input/1-output selectors 6a0, 6a1, 6a2, and 6a3 select the input from the response circuit 62 and the matrix circuits 63–65, respectively, or the input from the input circuit 61. A color conversion circuit block 6 is constructed by the input circuit 61 through the communication circuit 69. These circuits are mounted on a board or formed into an LSI chip or device.

The operation of the color conversion circuit block 6 will now be described. The control unit, which is not shown, reads the color characteristic data shown in FIG. 31 and sends the response conversion data, the RGB-to-XYZ conversion data, the inverse response conversion data, and the XYZ-to-RGB conversion data, which are described therein, to the color conversion circuit block 6. Further, color adjustment data is also sent and stored although the color adjustment data is not shown in FIG. 31. Specifically, the color adjustment data is read by the control unit and sent to the color conversion circuit block 6. The sent data is received by the communication circuit 69 and sent to the response circuit 62, the matrix circuit 63, the matrix circuit 64, the matrix circuit 65, or the response circuit 66 according to the contents of the data so as to set up the respective circuits. Specifically, the response conversion data is sent to the response circuit 62; the RGB-to-XYZ conversion data is sent to the matrix circuit 63; the color adjustment data is sent to the matrix circuit 64; the XYZ-to-RGB conversion data is sent to the matrix circuit 65; and the inverse response conversion data is sent to the response circuit 66.

Image data is received by the input circuit 61. The output of the input circuit 61 is supplied to the response circuit 62 and the selectors 6a0, 6a1, 6a2, and 6a3. The switching among the selectors 6a0, 6a1, 6a2, and 6a3 is performed in accordance with the instructions given by the control unit via the communication circuit 69. The control unit selects among the selectors 6a0, 6a1, 6a2, and 6a3 depending on which processing is to be implemented on the image data. Further, the selector 67 connected to the output of each processing circuit is also actuated in accordance with the instructions given by the control unit via the communication circuit 69. For instance, when only color adjustment need to be carried out, the selector 6a1 is set for the input circuit 61 and the remaining selectors 6a0, 6a2, and 6a3 are set for the processing circuits. Furthermore, the selector 67 is set so that the output of the matrix circuit 64 is selected.

The image data supplied to the response circuits 62 and 66 and the matrix circuits 63, 64, and 65 are subjected to the operations according to the color characteristic data which have been set up and the results thereof are output. The output data are supplied to the processing circuit in the subsequent stage or if selected by the selector 67, handed over to the output circuit 68, and sent to the external device.

In the ninth embodiment of the invention, the circuit block for the color correction LSI chip or device is shown; however, the LSI chip or device may alternatively be mounted on a board of a computer for image processing.

Figure 43:
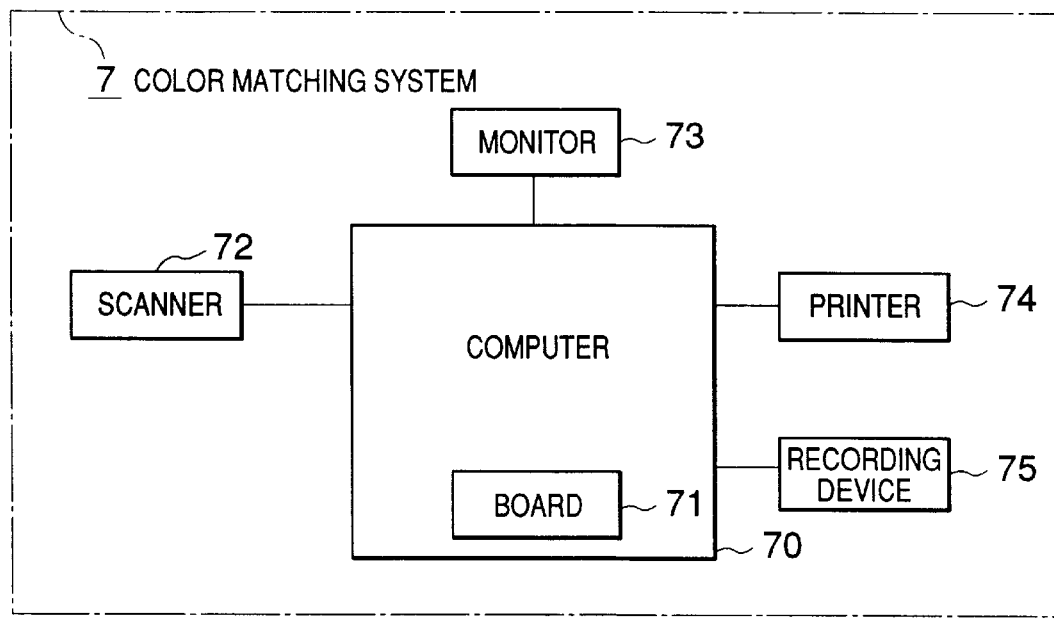
FIG. 43 illustrates the configuration of a color matching system according to the tenth embodiment of the present invention.

The tenth embodiment of the present invention will now be described. FIG. 43 shows the configuration of a color matching system 7 according to the tenth embodiment of the present invention. FIG. 43 illustrates a computer 70 which performs various types of control and processing. A board 71 contains the color correction LSI chip or device, which has been discussed in the ninth embodiment of the invention, is mounted on the computer 70. FIG. 43 further illustrates a scanner 72, a monitor 73, and a printer 74 connected to the computer 70. A recording device 75 is also connected to the computer 70, and records and stores image data and color characteristic data.

The operation of the color matching system 7 of FIG. 43 will now be described. The description will be given with respect to an example wherein the image data read through the scanner 72 is displayed on the monitor 73. The computer 70 reads the color characteristic data on the scanner 72 and the monitor 73, which are present in the recording device 75, and sets up the color correction LSI chip or device on the board 71. Then, the scanner 70 is actuated and color correction is performed via the board 71 on the image data output from the scanner 70 before the image data is sent to and displayed on the monitor 73. The same applies to a case wherein data is sent from the monitor 73 to the printer 74 or from the scanner 70 to the printer 74.

To record the image data read through the scanner 70 in the recording device 75, the following procedure is implemented. The computer 70 reads the color characteristic data on the scanner 72 from the recording device 75 and sets up the color correction circuit on the board 71. At this time, the selector 6a0 in the input stage is set so that it selects the output of the response circuit 62, and the selector 67 in the output stage is set so that it selects the output of the matrix circuit 63. Next, the scanner 70 is actuated and color correction is performed via the board 71 on the image data output from the scanner 70 and the result is provided as the XYZ data. The XYZ data is recorded in the recording device 75.

To display the image data recorded in the recording device 75 on the monitor 73, the following procedure is implemented. The computer 70 reads the color characteristic data on the monitor 73, which is present in the recording device 75, and sets up the color correction circuit on the board 71. At this time, the selector 6a in the input stage is set so that it selects the output of the input circuit 61, the selector 6a3 is set so that it selects the output of the matrix circuit 63, and the selector 67 in the output stage is set so that it selects the output of the response circuit 66. Subsequently, the image data recorded in the recording device 75 is read, the image data, which has been described in XYZ, is described in RGB via the board 71 and subjected to color correction. The RGB data is then displayed on the monitor 73.

As an alternative, the color correction stated in the ninth embodiment of the invention may be mounted on the scanner 72. The scanner 72 incorporates, in addition to the color correction circuit, an LSI chip or device for communication with a host computer and a RAM, ROM, EEPROM (erasable ROM), etc. for storing color characteristic data; the scanner 72, of course, also incorporates a sensor, an optical system and the like for reading an image.

The operation of this alternative color matching system will be described. The color correction circuits are set up by the color characteristic data (FIG. 31) stored in the ROM or the like; or the color correction circuits are set up by the color characteristic data sent from the host computer via the LSI chip or device for communication. After the setup, the scanner 72 scans an image, and the image data output from the scanner 72 is supplied to the color correction circuit where the image data undergoes color correction based on the color characteristic data.

As an alternative, the color correction circuit stated in the ninth embodiment of the invention may be mounted on the monitor 73. The monitor 73 incorporates, in addition to the color correction circuit, an LSI chip or device for communication with the host computer and a RAM, ROM, EEPROM (erasable ROM), etc. for storing color characteristic data; the monitor 73, of course, also incorporates a CRT and the like for displaying an image.

The color correction circuit is set up by the color characteristic data (FIG. 31) stored in the ROM or the like; or the color correction circuit is set up by the color characteristic data sent from the host computer via the LSI chip or device for communication. After the setup, the image data sent from the host computer is supplied to the color correction circuit where the image data undergoes operation based on the color characteristic data before it is displayed on the CRT.

As an alternative, the color correction circuit stated in the ninth embodiment of the invention may be mounted on the printer 74. The printer 74 incorporates, in addition to the color correction circuit, an LSI chip or device for communication with the host computer and a RAM, ROM, EEPROM (erasable ROM), etc. for storing color characteristic data; the printer 74, of course, also incorporates a thermal head, an ink head, a drum, and the like for printing images for each type of printing.

The color correction circuit is set up by the color characteristic data (FIG. 31) stored in the ROM or the like; or the color correction circuit is set up by the color characteristic data sent from the host computer via the LSI chip or device for communication. After the setup, the image data sent from the host computer is supplied to the color correction LSI where the image data undergoes operation based on the color characteristic data before it is sent to the head or the like for printing the image.

As an alternative, the color correction circuit stated in the ninth embodiment of the invention may be mounted on a hard disk (not shown) connected to the computer 70. The hard disk incorporates, in addition to the color correction circuit, an LSI chip or device for communication with the host computer; the hard disk, of course, also incorporates a disk for storing data, a read/write head, etc.

The color characteristic data shown in FIG. 31 is stored beforehand in the hard disk. The color correction circuit is set up using the color characteristic data (FIG. 31) which has been stored. Or, if a plurality of color characteristic data have been stored, then the setup is carried out using color characteristic data according to the instruction from the host computer via the LSI chip or device for communication. After the setup, the image data sent from the host computer is supplied to the color correction LSI chip or device where the image data is subjected to the operation based on the color characteristic data before it is sent to the head or the like and written to the hard disk. To read out the image data, the processing is implemented on the image data in the color correction circuit according to the instruction given by the host computer and the image data is sent to the host computer.

Figure 44:
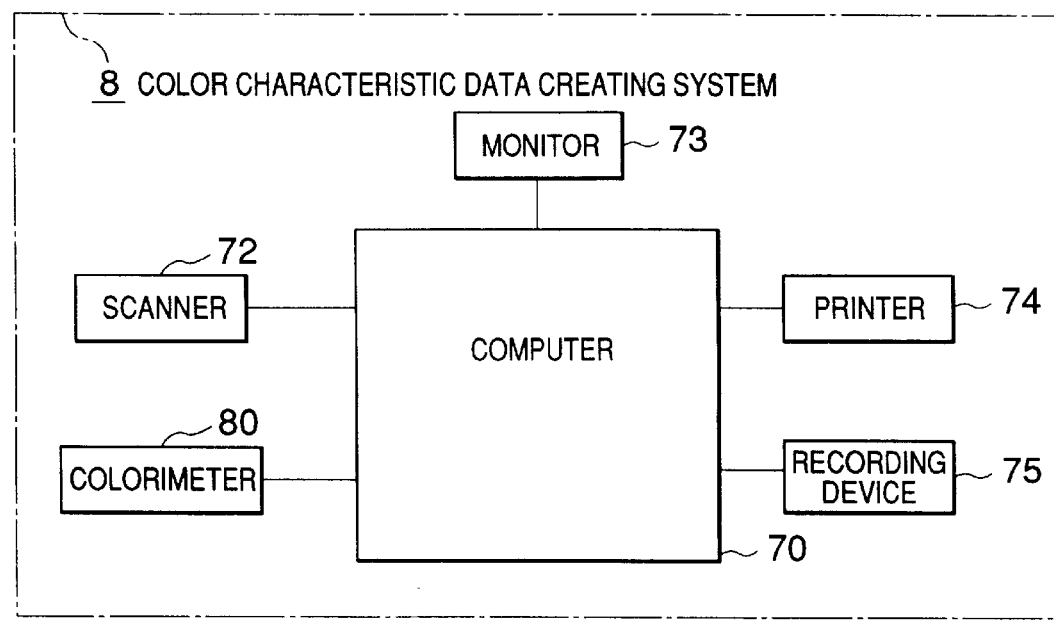
FIG. 44 illustrates the configuration of a color characteristic data creating system according to an eleventh embodiment of the present invention.

The eleventh embodiment of the invention will now be described. FIG. 44 shows the color characteristic data creating system 8 which forms an eleventh embodiment of the invention. FIG. 44 illustrates the computer 70 which performs various types of control and processing. FIG. 44 further illustrates the scanner 72, the monitor 73, and the printer 74 connected to the computer 70. The recording device 75 is also connected to the computer 70, and records and stores image data and color characteristic data. Additionally, a calorimeter 80, which is capable of measuring the colors of a test chart, an image printed by the printer 74 and an image displayed on the monitor 73 is connected to the computer 70.

Figure 45:
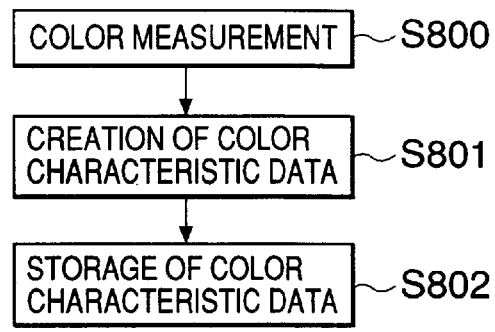
FIG. 45 is a flowchart of the procedure for creating the color characteristic data in the eleventh embodiment.
Figure 46:
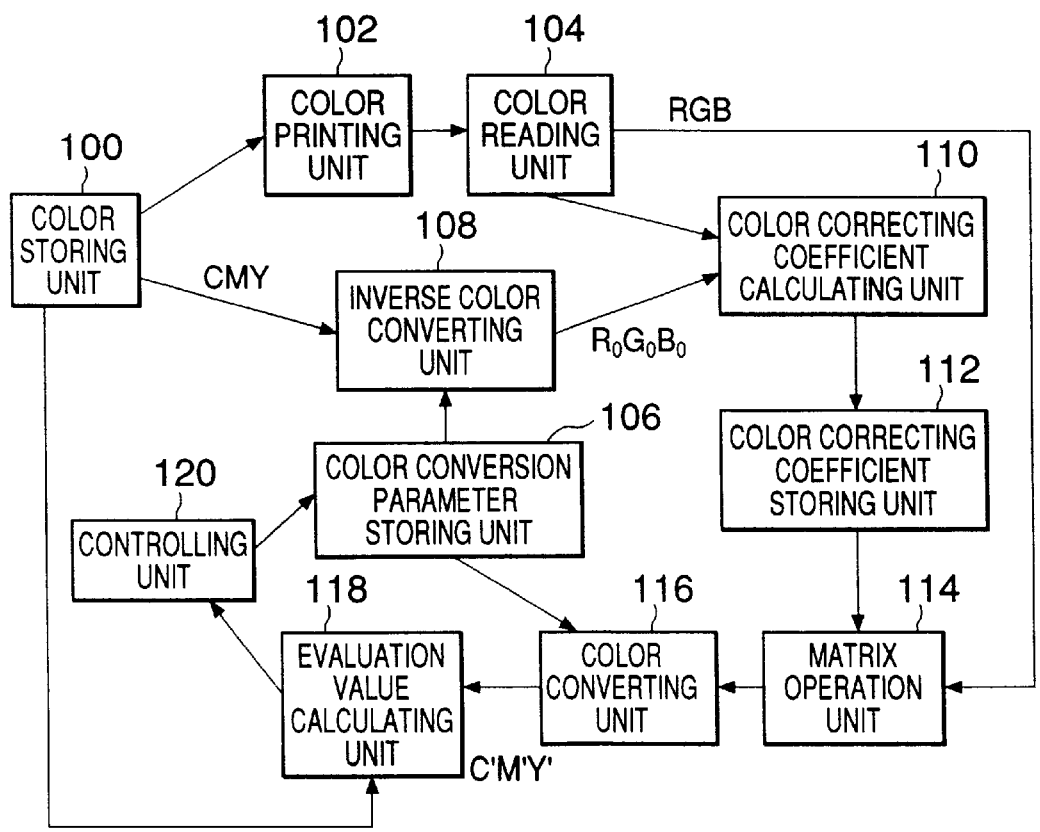
FIG. 46 is a block diagram of a prior art color correction parameter determining apparatus.

The operation of the color characteristic data creating system 8 of FIG. 44 will now be described. The eleventh embodiment of the invention is a system which creates color characteristic data by employing the method described in the first embodiment of the invention and the fifth embodiment of the invention. FIG. 45 shows the processing procedure.

Firstly, color measurement in step S800 is performed. For this purpose, the colors of the test chart in the case of the scanner 72, the display test chart displayed by the monitor 73 under the control of the computer 70, or the test chart printed out by the printer 74 under the control of the computer 70 are measured using the calorimeter 80. The color measurement data are taken into the computer 70 before proceeding to step S801 for creating color characteristic data.

In the step S801 for creating color characteristic data, the color characteristic data (FIG. 31) is created according to the method shown in the first embodiment of the invention and the fifth embodiment of the invention. Accordingly, a detailed description thereof will be omitted.

Then, the computer 70 proceeds to step S802 for storing the created color characteristic data. In this step, the color characteristic data (FIG. 31) which has been created in the step S801 is recorded in the recording device 75. The recorded color characteristic data (FIG. 31) is then read out and used for color correction as necessary.

The present invention converts a color input signal from an image input unit by employing the conversion matrix obtained based on the achromatic color component conversion matrix and the chromatic color component conversion matrix for an image input unit, and performs the inverse conversion step for inversely converting the conversion output given in the aforesaid conversion step by employing the inverse conversion matrix obtained based on the achromatic color component conversion matrix and the chromatic color component conversion matrix for an image output unit; therefore, good color correction with intact color balance can be achieved.

Further, according to the present invention, the above operation is carried out using a synthetic matrix, which is synthesized beforehand from the conversion matrix in the aforesaid conversion step and the inverse conversion matrix in the aforesaid inverse conversion step; therefore, the number of the operations based on the color correction matrices can be reduced, permitting quicker color correction processing.

Further, according to the present invention, the matrix operation is performed based on a lookup table system, thus permitting even quick color correction processing.

Furthermore, the present invention provides a first adjusting step and a second adjusting step for respectively correcting the achromatic color component conversion matrix and the chromatic color component conversion matrix of the conversion step or the inverse conversion step; therefore, the adjustment of the color correction processing can be performed.

Moreover, the present invention provides a plurality of image input units for converting a color signal by using the conversion matrix obtained according to the specific achromatic color component conversion matrix and the chromatic color component conversion matrix, and for issuing the converted color signal. The present invention further provides a plurality of image output units for inversely converting a color signal, which has been input, by using the inverse conversion matrix obtained according to the specific achromatic color component conversion matrix and chromatic color component conversion matrix; wherein the signal between the plurality of image input units and the plurality of image output units is the signal which has been converted using the conversion matrix. Therefore, each of the various pieces of image equipment can be provided with appropriate color characteristics, thus achieving a system which features good color control. A change of the combination of the image input units and the image output units simply requires changing the color characteristic data.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A color correcting method comprising:

converting a first color signal of a first format into a second color signal of a second format using a conversion matrix, said first format being a format used by an imaging device, said conversion matrix being associated with said imaging device, said conversion matrix being obtained based on an achromatic color component conversion matrix and a chromatic color component conversion matrix representing chromaticity and achromaticity of said imaging device; and inversely converting said second color signal into a third color signal of a third format, said third format being a format used by an image output unit, said inverse converting being performed using an inverse conversion matrix, said inverse conversion matrix being obtained based on an inverse of a conversion matrix associated with said image output unit, and said conversion matrix associated with said image output unit being obtained based on an achromatic color component conversion matrix and chromatic color component conversion matrix representing chromaticity and achromaticity of said image output unit, wherein said conversion matrix associated with said imaging device is mathematically independent of said conversion matrix associated with said image output unit; and wherein said achromatic color component conversion matrix and said chromatic color component conversion matrix associated with said imaging device are generated according to the steps of:

setting an achromatic color vector associated with said imaging device based on a white point and black point associated with said imaging device;

setting chromatic color vectors based on points of three primary colors in said first format associated with said imaging device;

decomposing each chromatic color vector into a first and second vector based on said achromatic color vector, said first vector being parallel to said achromatic color vector, and said second vector being perpendicular to said achromatic color vector;

determining said achromatic color component conversion matrix in accordance with said first vector decomposed from each of said chromatic color vectors;

determining said chromatic color component conversion matrix in accordance with said second vector decomposed from each of said chromatic color vectors; and wherein said determining said chromatic color component conversion matrix step includes the steps of:
determining third vectors, each third vector having the same direction and corresponding to one of said second vectors, said third vectors being determined such that a sum of said third vectors equals zero, and a sum of the differences between magnitudes of each third vector and a corresponding one of said second vectors is a minimum; and
determining said chromatic color component conversion matrix in accordance with said third vectors.

2. A color correcting method according to claim 1, wherein said conversion step and said inverse conversion step are simultaneously carried out using a synthetic matrix which is synthesized from said conversion matrix and said inverse conversion matrix.

3. A color correcting method according to claim 1, wherein operation based on said conversion matrix in said conversion step is performed by employing a lookup table.

4. A color correcting method according to claim 1, wherein operation based on the inverse conversion matrix in said inverse conversion step is performed by employing a lookup table.

5. A color correcting method according to claim 1, comprising:
implementing a response conversion associated with said imaging device on said first color signal before said conversion step, said response conversion linearizing chromatic and achromatic components of said first color signal; and
implementing an inverse response conversion associated with said image output unit on said third color signal, said inverse response conversion being an inverse of a response conversion associated with said color output unit.

6. A color correcting method according to claim 1, wherein said achromatic color component conversion matrix and said chromatic color component conversion matrix associated with each of said imaging device and said color output unit are independent from each other.

7. A color correcting method according to claim 1, wherein said conversion matrix associated with said imaging device and said conversion matrix associated with said image output unit keeps an achromatic color axis of said imaging device and an achromatic color axis of said image output unit unchanged during said conversion step and said inverse conversion step, respectively.

8. A color correcting method according to claim 1, wherein said first format and said third format are the same format.

9. A color correcting method according to claim 1, wherein said imaging device is a scanner, and said color output device is one of a monitor and a printer.

10. A color correcting method comprising:
converting a first color signal of a first format into a second color signal of a second format using a conversion matrix,
said first format being a format used by an imaging device, said conversion matrix being associated with said imaging device,
said conversion matrix being obtained based on an achromatic color component conversion matrix and a chromatic color component conversion matrix representing chromaticity and achromaticity of said imaging device; and
inversely converting said second color signal into a third color signal of a third format, said third format being a format used by an image output unit,
said inverse converting being performed using an inverse conversion matrix, said inverse conversion matrix being obtained based on an inverse of a conversion matrix associated with said image output unit, and said conversion matrix associated with said image output unit being obtained based on an achromatic color component conversion matrix and chromatic color component conversion matrix representing chromaticity and achromaticity of said image output unit, wherein said conversion matrix associated with said imaging device is mathematically independent of said conversion matrix associated with said image output unit;

wherein said achromatic color component conversion matrix and said chromatic color component conversion matrix associated with said color output unit are generated according to the steps of:
setting an achromatic color vector associated with said color output unit based on a white point and black point associated with said color output unit;
setting chromatic color vectors based on points of three primary colors in said third format associated with said color output unit;
decomposing each chromatic color vector into a first and second vector based on said achromatic color vector, said first vector being parallel to said achromatic color vector, and said second vector being perpendicular to said achromatic color vector;
determining said achromatic color component conversion matrix in accordance with said first vector decomposed from each of said chromatic color vectors; and determining said chromatic color component conversion matrix in accordance with said second vector decomposed from each of said chromatic color vectors, wherein said determining said chromatic color component conversion matrix stem includes the steps of:
determining third vectors, each third vector having the same direction and corresponding to one of said second vectors, said third vectors being determined such that a sum of differences between magnitudes of each third vector and a corresponding one of said second vectors is a minimum; and
determining said chromatic color component conversion matrix in accordance with said third vectors.

11. A color correcting method comprising:

converting a first color signal of a first format into a second color signal of a second format using a conversion matrix, said first format being a format used by an imaging device, said conversion matrix being associated with said imaging device, said conversion matrix being obtained based on an achromatic color component conversion matrix and a chromatic color component conversion matrix representing chromaticity and achromaticity of said imaging device; and inversely converting said second color signal into a third color signal of a third format, said third format being a format used by an image output unit, said inverse converting being performed using an inverse conversion matrix, said inverse conversion matrix being obtained based on an inverse of a conversion matrix associated with said image output unit, and said conversion matrix associated with said image output unit being obtained based on an achromatic color component conversion matrix and chromatic color component conversion matrix representing chromaticity and achromaticity of said image output unit, wherein said conversion matrix associated with said imaging device is mathematically independent of said conversion matrix associated with said image output unit, wherein said achromatic color component conversion matrix and said chromatic color component conversion matrix associated with said imaging device are generated according to the steps of:
decomposing a predetermined color correcting matrix associated with said imaging device into a reference vector;
setting column vectors representing each column of said predetermined color correcting matrix;
decomposing each column vector into a first and second vector, said first vector being parallel to said achromatic color vector, and said second vector being perpendicular to said achromatic color vector;
setting an achromatic color vector associated with said imaging device based on a white point and black point associated with said imaging device;
adjusting said first and second vectors in accordance with said achromatic color vector;
determining said achromatic color component conversion matrix in accordance with said first vectors; and
determining said chromatic color component conversion matrix in accordance with said second vectors.

12. A color correcting method comprising:

converting a first color signal of a first format into a second color signal of a second format using a conversion matrix, said first format being a format used by an imaging device, said conversion matrix being associated with said imaging device, said conversion matrix being obtained based on an achromatic color component conversion matrix and a chromatic color component conversion matrix representing chromaticity and achromaticity of said imaging device; and inversely converting said second color signal into a third color signal of a third format, said third format being a format used by an image output unit, said inverse converting being performed using an inverse conversion matrix, said inverse conversion matrix being obtained based on an inverse of a conversion matrix associated with said image output unit, and said conversion matrix associated with said image output unit being obtained based on an achromatic color component conversion matrix and chromatic color component conversion matrix representing chromaticity and achromaticity of said image output unit, wherein said conversion matrix associated with said imaging device is mathematically independent of said conversion matrix associated with said image output unit, wherein said achromatic color component conversion matrix and said chromatic color component conversion matrix associated with said color output unit are generated according to the steps of:
decomposing a predetermined color correcting matrix associated with said color output unit into a reference vector;
setting column vectors representing each column of said predetermined color correcting matrix;
decomposing each column vector into a first and second vector, said first vector being parallel to said achromatic color vector, and said second vector being perpendicular to said achromatic color vector;
setting an achromatic color vector associated with said color output unit based on a white point and black point associated with said color output unit;
adjusting said first and second vectors in accordance with said achromatic color vector;
determining said achromatic color component conversion matrix in accordance with said first vectors; and
determining said chromatic color component conversion matrix in accordance with said second vectors.

13. A color correcting method comprising:

converting a first color signal of a first format into a second color signal of a second format using a conversion matrix, said first format being a format used by an imaging device, said conversion matrix being associated with said imaging device, said conversion matrix being obtained based on an achromatic color component conversion matrix and a chromatic color component conversion matrix representing chromaticity and achromaticity of said imaging device;

inversely converting said second color signal into a third color signal of a third format, said third format being a format used by an image output unit, said inverse converting being performed using an inverse conversion matrix, said inverse conversion matrix being obtained based on an inverse of a conversion matrix associated with said image output unit, and said conversion matrix associated with said image output unit being obtained based on an achromatic color component conversion matrix and chromatic color component conversion matrix representing chromaticity and achromaticity of said image output unit, wherein said conversion matrix associated with said imaging device is mathematically independent of said conversion matrix associated with said image output unit;

a first adjusting step for adjusting said achromatic color component conversion matrix of said conversion step; and a second adjusting step for adjusting said chromatic color component conversion matrix of said conversion step, wherein said first adjusting step comprises:
performing a matrix operation on reference image data using said achromatic color component conversion matrix to generate an achromatic color component conversion image;
first evaluating a degree of achromatic color in said achromatic color component conversion image;
second evaluating a degree of brightness in said achromatic color component conversion image;
adjusting a plurality of vectors constituting said achromatic color component conversion matrix to change color balance and brightness of said achromatic color component conversion image based on said first and second evaluating steps; and
determining an adjusted achromatic color component conversion matrix according to said adjusted vectors.

14. A color correcting method according to claim 13, wherein said adjusting a plurality of vectors step comprises at least one of the following steps when one of said first and second evaluating steps indicates to adjust said plurality of vectors, changing a magnitude ratio among said plurality of vectors to change intermediate gray balance;

changing directions of said plurality of vectors with a black point of each vector as a pivot point to change a balance of color close to a white point without changing a balance of color close to said black point;

changing directions of said plurality of vectors with said white point of each vector as a pivot point to change a balance of a color close to said black point without changing a balance of a color close to said white point;

changing magnitudes of said plurality of vectors with said black point remaining fixed to change brightness of a color close to said white point; and changing magnitudes of said plurality of vectors with said white point remaining fixed to change brightness of a color close to said black point.

15. A color correcting method comprising:
converting a first color signal of a first format into a second color signal of a second format using a conversion matrix, said first format being a format used by an imaging device, said conversion matrix being associated with said imaging device, said conversion matrix being obtained based on an achromatic color component conversion matrix and a chromatic color component conversion matrix representing chromaticity and achromaticity of said imaging device;

inversely converting said second color signal into a third color signal of a third format, said third format being a format used by an image output unit, said inverse converting being performed using an inverse conversion matrix, said inverse conversion matrix being obtained based on an inverse of a conversion matrix associated with said image output unit, and said conversion matrix associated with said image output unit being obtained based on an achromatic color component conversion matrix and chromatic color component conversion matrix representing chromaticity and achromaticity of said image output unit, wherein said conversion matrix associated with said imaging device is mathematically independent of said conversion matrix associated with said image output unit;

a first adjusting step for adjusting said achromatic color component conversion matrix of said conversion step;

a second adjusting step for adjusting said chromatic color component conversion matrix of said conversion step;

wherein said second adjusting step comprises:
performing a matrix operation on reference image data using said chromatic color component conversion matrix to generate a chromatic color component conversion image;
first evaluating a degree of vividness of said chromatic color component conversion image;
second evaluating a degree of hue of said chromatic color component conversion image;
adjusting a plurality of vectors constituting said chromatic color component conversion matrix to change hue and vividness of said achromatic color component conversion image based on said first and second evaluating steps; and
determining an adjusted chromatic color component conversion matrix according to said adjusted vectors.

16. A color correcting method according to claim 15, wherein said adjusting said plurality of vectors step comprises at least one of the following steps when one of said first and second evaluating steps indicates to adjust said plurality of vectors, changing directions of said plurality of vectors to change hue of said chromatic color component conversion image; and changing magnitudes of said plurality of vectors to change vividness of said chromatic color component conversion image.

* * * * *